United States Patent [19]
Philipp

[11] Patent Number: 6,025,683
[45] Date of Patent: Feb. 15, 2000

[54] MOTOR CONTROL CIRCUIT FOR REGULATING A D.C. MOTOR

[75] Inventor: Chris Philipp, Portage, Mich.

[73] Assignee: Stryker Corporation, Kalamazoo, Mich.

[21] Appl. No.: 09/220,167

[22] Filed: Dec. 23, 1998

[51] Int. Cl.[7] ................................................. H02P 5/17
[52] U.S. Cl. .......................... 318/257; 318/139; 318/258; 388/937
[58] Field of Search .................................... 318/139, 255, 318/256, 257, 268, 798–801, 807, 810, 811, 258; 388/937

[56] References Cited

U.S. PATENT DOCUMENTS

| | | | |
|---|---|---|---|
| 4,047,083 | 9/1977 | Plunkett | 318/807 |
| 4,292,577 | 9/1981 | Cesarz et al. | 318/802 |
| 4,327,315 | 4/1982 | Kawada et al. | 318/811 |
| 4,727,305 | 2/1988 | Muskovac et al. | 318/798 |
| 5,173,651 | 12/1992 | Buckley et al. | 318/701 |
| 5,747,953 | 5/1998 | Philipp | 318/139 |

OTHER PUBLICATIONS

Micrel, MPD8021, component specifications, pp. 17–20 and 22 May, 1997, Micrel, Inc., San Jose, CA 95131–1724.

*Primary Examiner*—Bentsu Ro
*Attorney, Agent, or Firm*—Flynn, Thiel, Boutell & Tanis, P.C.

[57] ABSTRACT

A motor control chip (62) for asserting the control signals used to regulate the energization of the windings of a DC motor. The motor control chip includes a tachometer (94) that receives pulsed signals that vary with the rotation of the motor rotor and that produces a pulse width modulated tachometer signal as a function of the motor speed. A pulse width modulator (90) receives the tachometer signal and an analog signal representative of the user-selected motor speed. Based on the received input signals, the pulse width modulator produces a variable speed control signal. A forward/reverse oscillator (92) receives user-set signals indicating if the motor should be run in the forward or reverse directions or in an oscillatory pattern. Based on the received signals, the forward/reverse oscillator asserts a forward/reverse signal having an appropriate signal state or cycle. A motor decoder (98) receives the signals produced by the pulse width oscillator and the forward/reverse oscillator. The motor decoder then asserts the control signals that regulate when power switches selectively tie the motor windings to either a power source or ground.

23 Claims, 17 Drawing Sheets

MOTOR CONTROL CIRCUIT FOR REGULATING A D.C. MOTOR

FIELD OF THE INVENTION

This invention relates generally to a motor control circuit for regulating the application of energization voltages to a D.C. motor such as a motor found in a powered surgical tool. More particularly, this invention is directed to a motor control circuit in which the primary motor control sub-circuits are contained on a single integrated circuit.

BACKGROUND OF THE INVENTION

Two components integral with an electrically driven tool or device is the motor that converts electrical energy into mechanical energy for accomplishing a desired task and the complementary motor control circuit. One class of electrically driven tools that include both a motor and a motor controller is the electrically powered surgical tool. These tools typically include a handpiece in which the motor is housed. A complementary medical accessory such as a drill, a saw blade or a wire driver is coupled to the handpiece. A gear assembly transfers the rotational power of the motor rotor to the medical accessory in order to cause the accessory to engage in the desired motion. The development of powered surgical tools has lessened the physical strain of surgeons and other personnel when performing medical procedures on a patient. Moreover, most surgical procedures can be performed more quickly, and more accurately, with powered surgical tools than with the manual equivalents that proceeded them.

The motor control circuit regulates the application energization current to the motor in order to cause the motor rotor to turn both at the desired speed and in the desired direction. One such control circuit is disclosed in the Inventor's U.S. Pat. No. 5,747,953, entitled CORDLESS, BATTERY OPERATED SURGICAL TOOL, issued May 5, 1998, which is incorporated herein by reference. The foregoing patent discloses a motor control circuit response that receives as inputs signals indicating: the direction the motor is to be driven, forward, reverse or oscillatory; the speed at which the motor is be driven; and the speed the motor rotor is turning. Based on these input signals, this motor controller selectively ties the windings integral with the motor to a voltage source or ground. The tieing of the windings to the voltage source or ground causes appropriate electromagnetic fields to develop around the windings to, in turn, cause the motor rotor to turn in the desired direction at the desired speed. In the event the rotor is turning faster than the desired speed, the circuit disclosed in this patent is ties the windings to ground so that the windings develop a braking electromotive force that slows the rotor down. The circuit disclosed in this patent is also has failsafe features that prevent the windings being placed in the braking mode if such act could potentially be harmful to the motor or the tool in which it is installed.

The motor control circuit disclosed in the above patent has proven to a very useful circuit for providing precision control for a D.C. powered motors. It should be noted however, that this circuit has numerous discrete components. Recently, there has been interest in providing a motor control circuit in which as many of sub-circuits that comprise the circuit as possible are contained on a single integrated circuit chip. An advantage of so constructing a motor control circuit is that it decreases the size of the circuit and reduce its cost of manufacture and maintenance while, at the same time, increasing its reliability. However, the above circuit includes a large number of both analog and digital signal processing components. Accordingly, it has proven very difficult to fabricate a single integrated semiconductor component, a chip, in which a substantial number of the components that form this motor control circuit are present.

SUMMARY OF THE INVENTION

This invention relates to an improved motor control circuit for regulating the energization voltages applied to a D.C. motor. The motor control circuit of this invention includes a set of components that form most of the sub-circuits of the circuit that can be fabricated together on a single substrate, a single semiconductor chip.

BRIEF DESCRIPTION OF THE DRAWINGS

The invention is pointed out with particularity in the claims. The above and further advantages of this invention may be better understood by reference to the following description taken in conjunction with the accompanying drawings in which:

FIG. 3 is an assembly diagram illustrating how

FIG. 4 is an assembly diagram illustrating how

DETAILED DESCRIPTION

Figure 1:
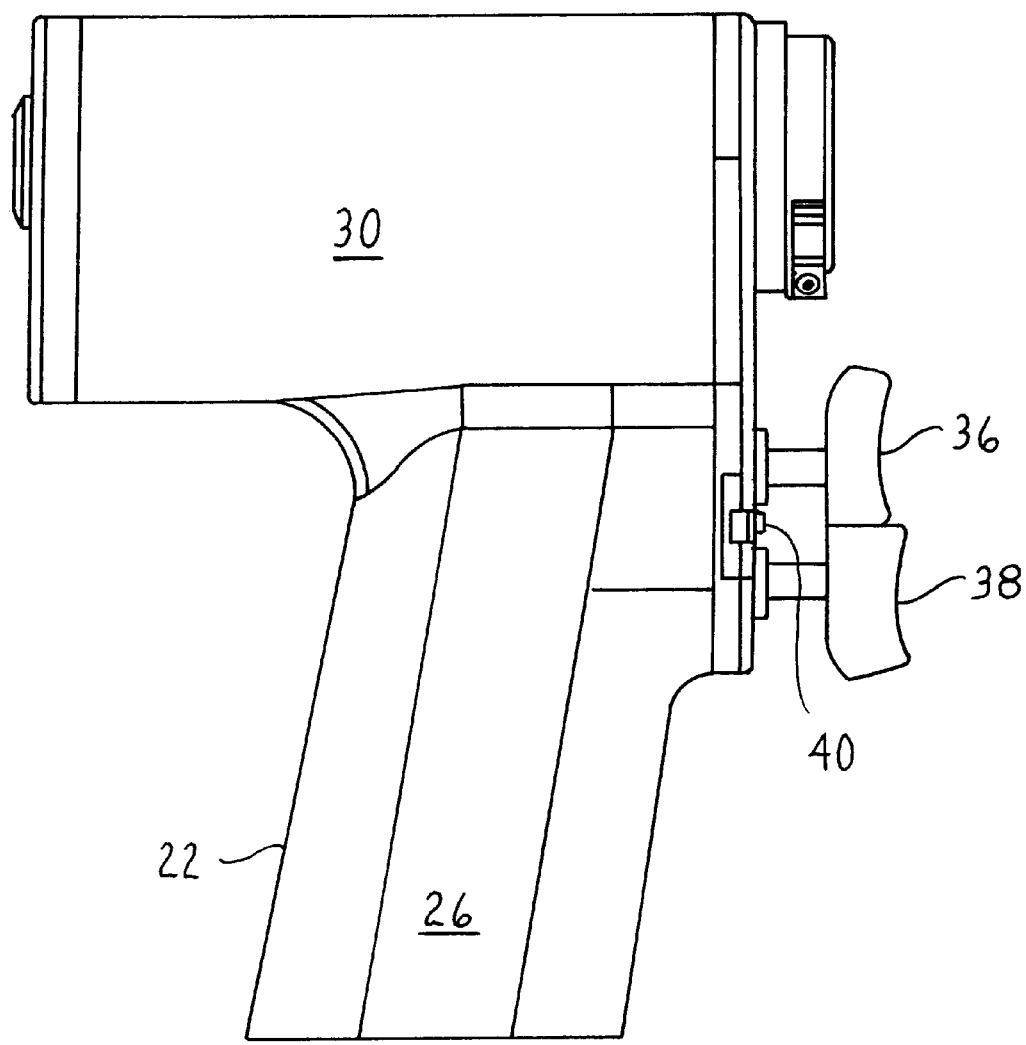
FIG. 1 is a side view of a powered tool in which the motor control circuit of this invention is incorporated.
Figure 2:
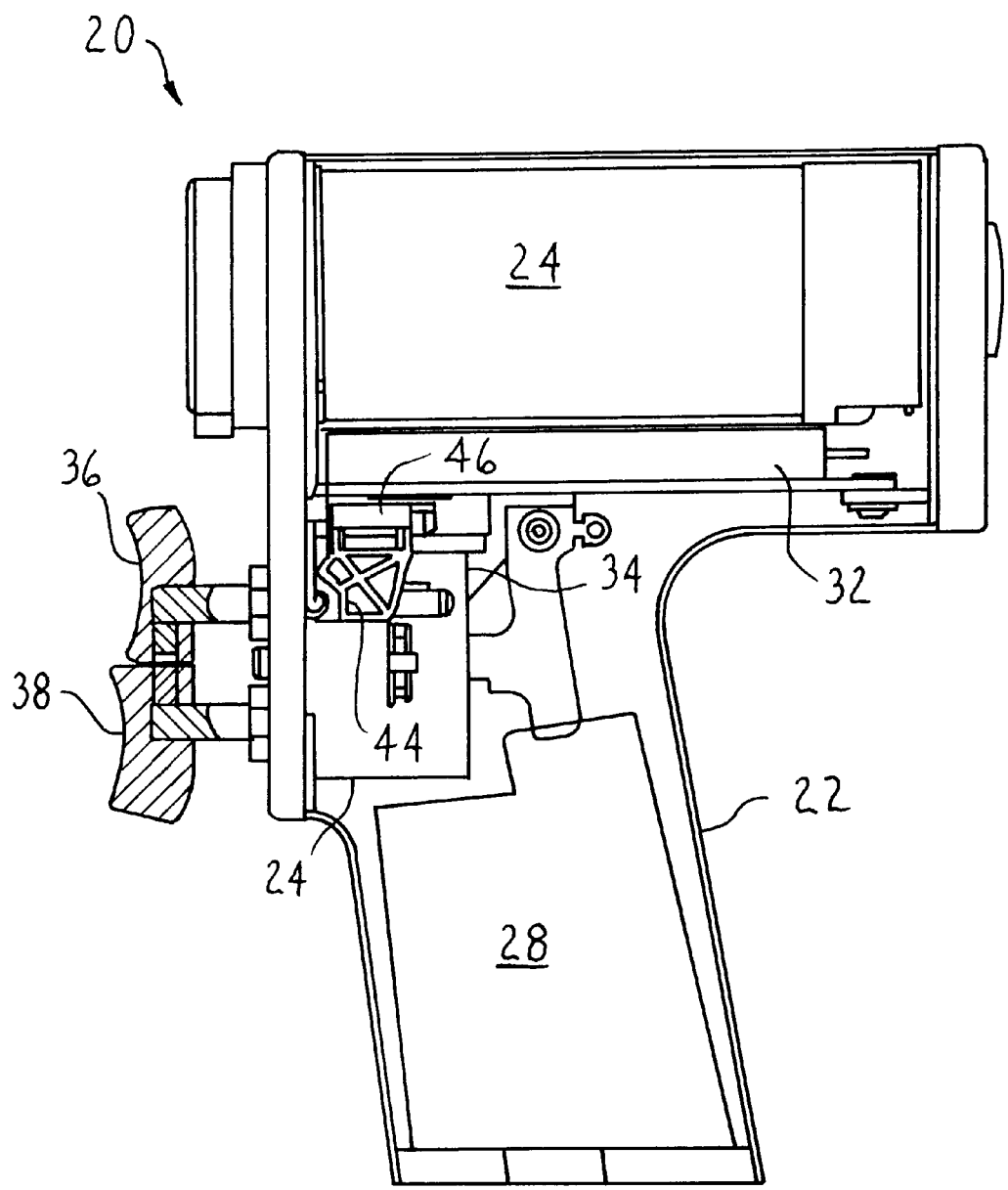
FIG. 2 is a side view of the components internal to the powered tool of FIG. 3.

FIGS. 1 and 2 illustrate a power tool 20, a surgical drill, in which a motor control circuit of this invention is employed. Tool 20 includes a tool housing 22 which contains an electrically powered motor 24. The tool housing 22 has a lower section referred to as a handgrip 26. A battery 28 contained within handgrip 26 supplies the power required to energize the motor 24. Formed integrally with the handgrip 26 and extending along the top of the handgrip is the motor section 30 of the housing 22 in which the motor is secured. Located immediately below the motor section 30 is a sealed control module 32 in which the motor control circuit of this invention is housed.

A trigger assembly 34 mounted in the tool housing 22 below module 32 provides the switches that allow an individual to control the actuation of the motor 24. Specifically, trigger assembly 34 includes upper and lower trigger switches 36 and 38, respectively. By pressing upper trigger switch 36, the tool motor 24 can be driven in the reverse direction. By pressing lower trigger switch 38, motor 24 can be driven in the forward direction. (For many, but not all powered surgical drills, when facing the front end of the tool, counterclockwise rotation is considered forward rotation; clockwise rotation is considered reverse rotation.) By depressing both trigger switches 36 and 38 simultaneously, the motor 24 can be actuated into oscillatory (forward-reverse-forward-reverse) movement. Trigger assembly 34 also has a safety lever 40. Safety lever 40 can be selectively set to prevent the actuation of one or both of trigger switches 36 and 38.

Figure 3A:
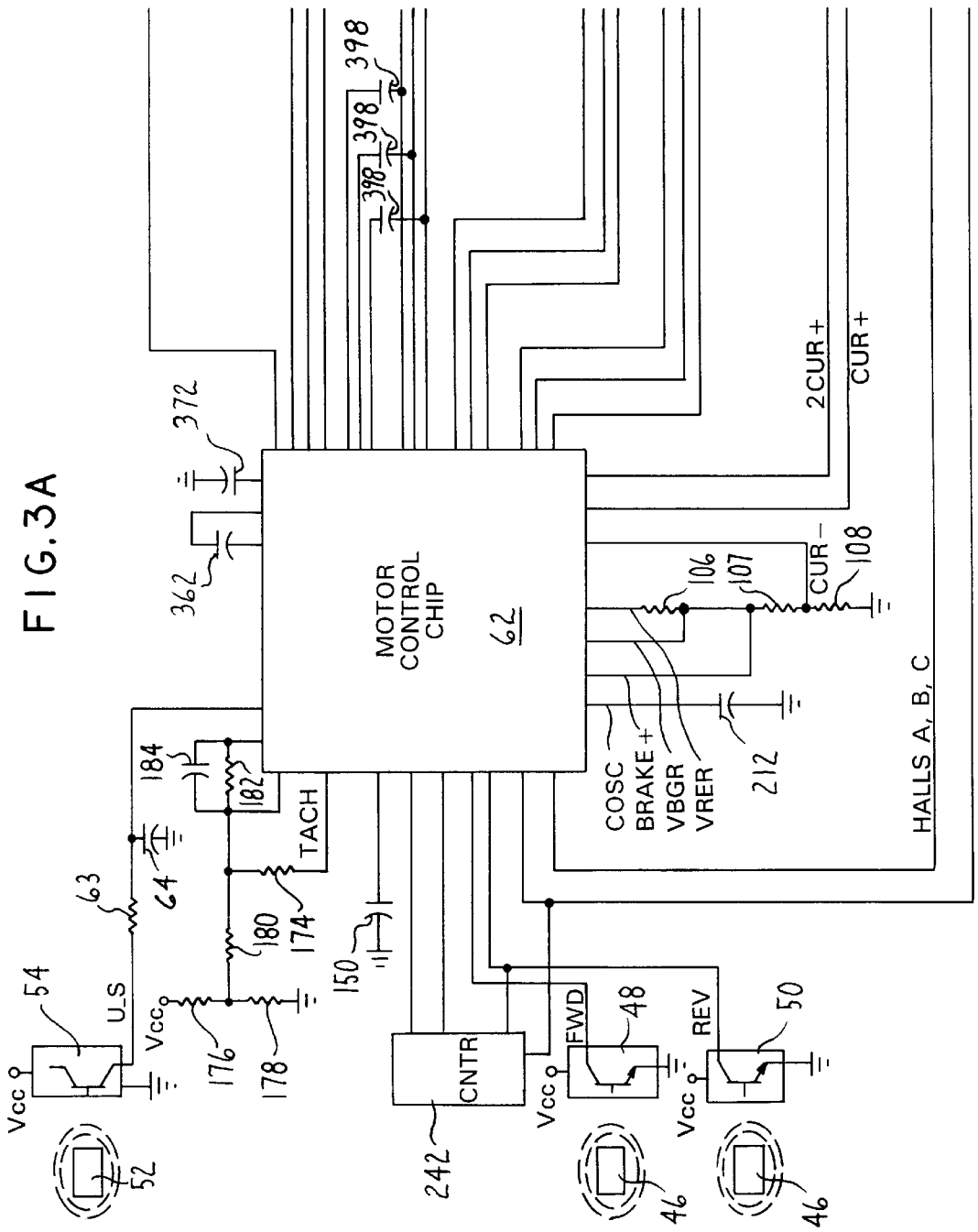
FIGS. 3A and 3B are arranged together to form a schematic and block diagram of the motor control circuit of this invention.

The basic control of the tool 20 is now explained by reference to FIGS. 2 and 3A. Integral with each trigger switch is a carrier 44, (one shown) that is located immediately below the sealed module 32. A magnet 46, is located in each carrier 44 to be located adjacent to the module 32. The depression of a trigger 36 or 38 causes the associated magnet 46 to move rearwardly. The movement of the magnet 46 is monitored by a Hall sensor 48 or 50 internal to sealed module 32. In the depicted version of the invention, Hall sensor 48 monitors the position of the magnet 46 associated with the lower trigger switch 38; Hall sensor 50 monitors the position of the magnet 46 associated with upper trigger switch 36. Hall sensors 48 and 50 thus generate the signals that indicate if the motor 24 is to be driven in forward, reverse or oscillatory motion.

The speed of the motor 24 is determined by the position of a magnet 52 also part of trigger assembly 34. Magnet 52 is held in center carrier (not illustrated). The center carrier is displaced rearwardly whenever either one of the carriers 44 associated with trigger switches 36 or 38 engage in a like motion. A Hall sensor 54, also internal to sealed module 32, generates a signal representative of the position of magnet 52. The signal produced by Hall sensor 54 thus serves as a USER_SPEED (U_S) signal representative of the user-selected speed for the motor 24. A more complete description of trigger assembly 34 is found in the Inventor's U.S. Pat. No. 5,747,953, which is incorporated herein by reference.

Figure 3B:
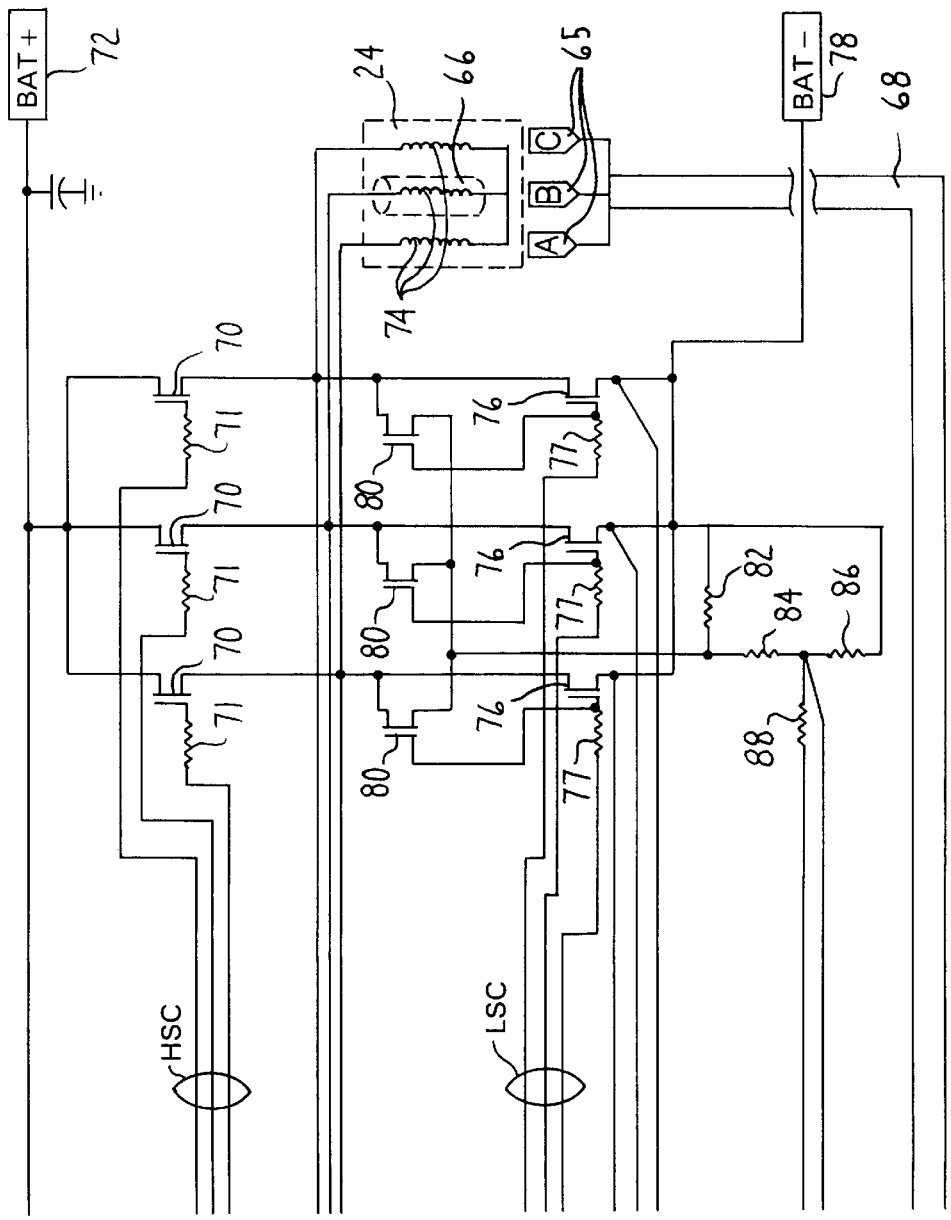

An overview of a motor control circuit 60 of this invention is now described by reference to FIGS. 3A and 3B. Circuit 60 includes a motor control chip 62, a single integrated circuit chip, to which the primary signals for regulating the motor 24 are applied. Motor control chip 62, upon receiving the input control signals, generates a set of output signals that regulate the application of energization voltages to the motor 24. In some versions of the invention, motor control chip 62 is a custom designed chip manufactured by Micrel, Inc of San Jose, Calif. from a generic chip identified as Part No. MPD8021.

More specifically, motor control chip 62 receives FORWARD (FWD), REVERSE (REV) and USER_SPEED (U_S) signals generated by the Hall sensors 48, 50 and 54, respectively. In the depicted version of the invention, the USER_SPEED signal from Hall sensor 54 is applied to motor control chip 62 through a resistor 63. A capacitor 64 tied between the input terminal of the chip 62 and ground provides the final filtering of the USER_SPEED signal. Motor control chip 62 also receives signals, HALLS A, B and C, produced by three Hall sensors 65 mounted in the motor 24. Each motor-mounted Hall sensor 65 generates a signal based the rotational position of the rotor 66 integral with the motor 24 relative to the sensor 65. In FIG. 3B, rotor 66 is depicted as a phantom cylinder. A multi-wire bus 68 is shown as providing the conductive path from motor-mounted Hall sensors 65 to motor control chip 62 though that need not always be the case. The signals produced by Hall sensors 65 are characterized as pulsed signals.

Based on the above-described primary input signals, as well as some clock and reference signals described hereinafter, motor control chip 62 generates both HIGH_SIDE_CONTROL (HSC) and LOW_SIDE_CONTROL (LSC) signals. The HIGH_SIDE_CONTROL signals are applied to the gates of three FETs 70 through resistors 71. The drains of FETs 70 are connected to a contact 72 to which the positive terminal of the battery 28 is connected. The source of each FET 70 is connected to a separate one of the windings 74 that form motor 24. The LOW_SIDE_CONTROL signals are applied to the gates of separate FETs 76 through resistors 77. The drain of each FET 76 is tied to one of the windings 74. The sources of FETs 76 are tied to a contact 78 to which the negative terminal of battery 28 is connected. The HIGH_and LOW_SIDE_CONTROL signals selectively turn FETs 70 and 76, respectively, on and off. The turning on and off of FETs 70 and 76 cause energization current to selectively flow through the windings 74. The selective application of the energization current through the windings 74 cause the motor rotor 66 to turn in the desired direction at the desired speed.

In the depicted motor control circuit 60, three FETs 80 are located between the windings 74 and FETs 76. Each FET 80 has a drain connected between one of the windings 74 and the FET 76 to which the winding is connected. The turn-on signal applied to the gate of each FET 76 is applied to the gate of the associated FET 80. The sources of FETs 80 are connected to a junction between two resistors 82 and 84. The opposite end of resistor 82 is connected to the ground conductor that extends to the BAT-contact 78. The opposed end of resistor 84 is connected to a resistor 86. The end of resistor 86 distal from resistor 84 is connected to the ground conductor that extends to the BAT-contact 78. Collectively, resistors 82, 84 and 86 form a current-measuring network for measuring current flow through the motor windings 74. The voltage present at the junction of resistors 84 and 86 is measured by the chip as indication of current flow through the motor. The current measuring network also includes a resistor 88 that is connected between the junction of resistors 84 and 86 and a 2CUR+ terminal on chip 62. Resistor 88 has a resistance substantially less than that of resistor 86. Resistor 88 is selectively connected to ground by chip 62 for reasons discussed hereinafter.

Each time a LOW_SIDE_CONTROL signal is asserted to turn on one of the FETs 76, the associated FET 80 is turned on. The turning on of the FET 80 causes a small current flow from the winding 74 to which the energization voltage is being applied to flow through the current-measuring network. The signal present at the junction of resistors 84 and 86 is a CUR+ signal which is applied a terminal of the motor control chip 62 as a measure of current flow through the motor 24.

Figure 4A:
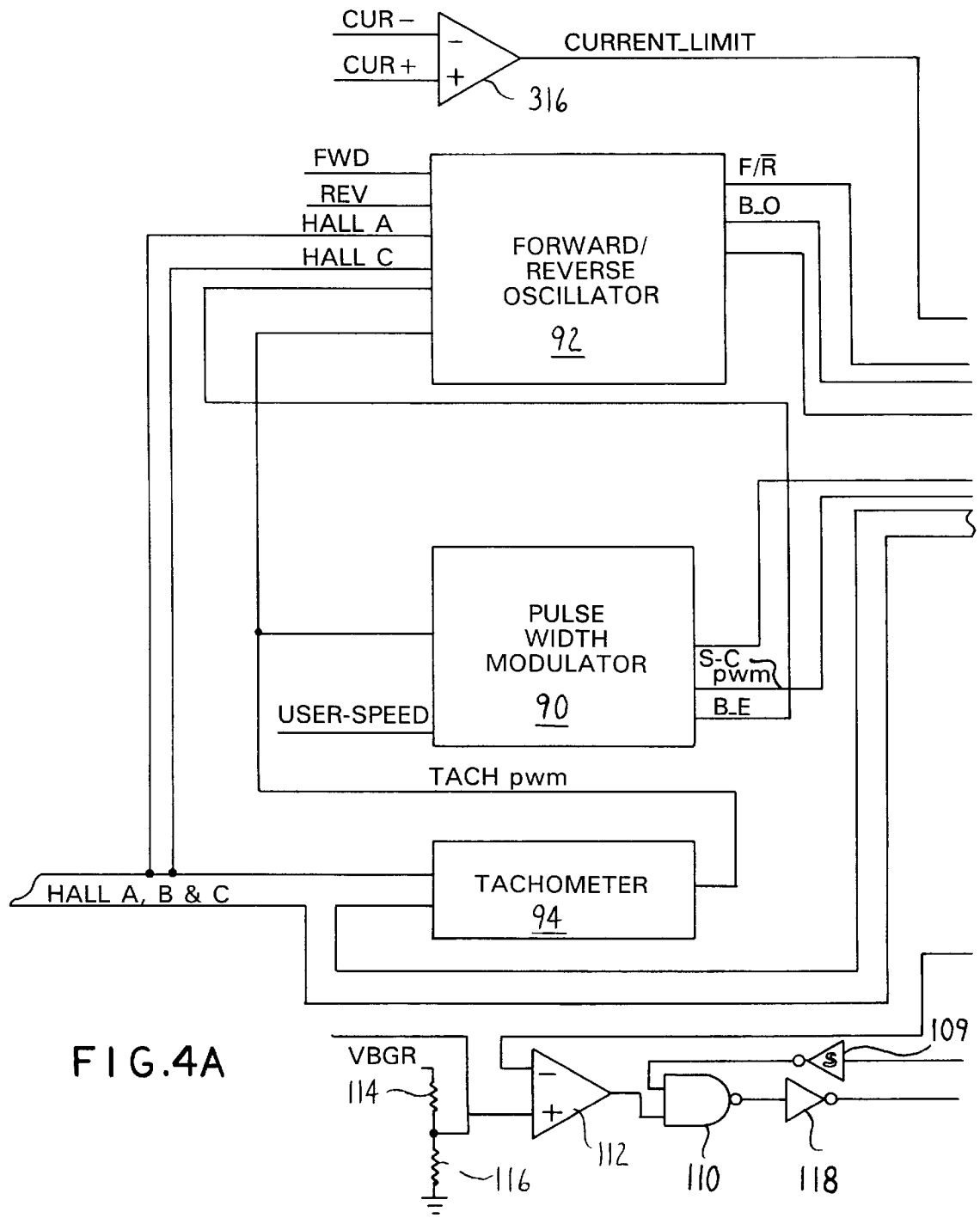
FIGS. 4A and 4B are arranged together to form a block diagram of the sub-circuits internal to the motor control chip.
Figure 4B:
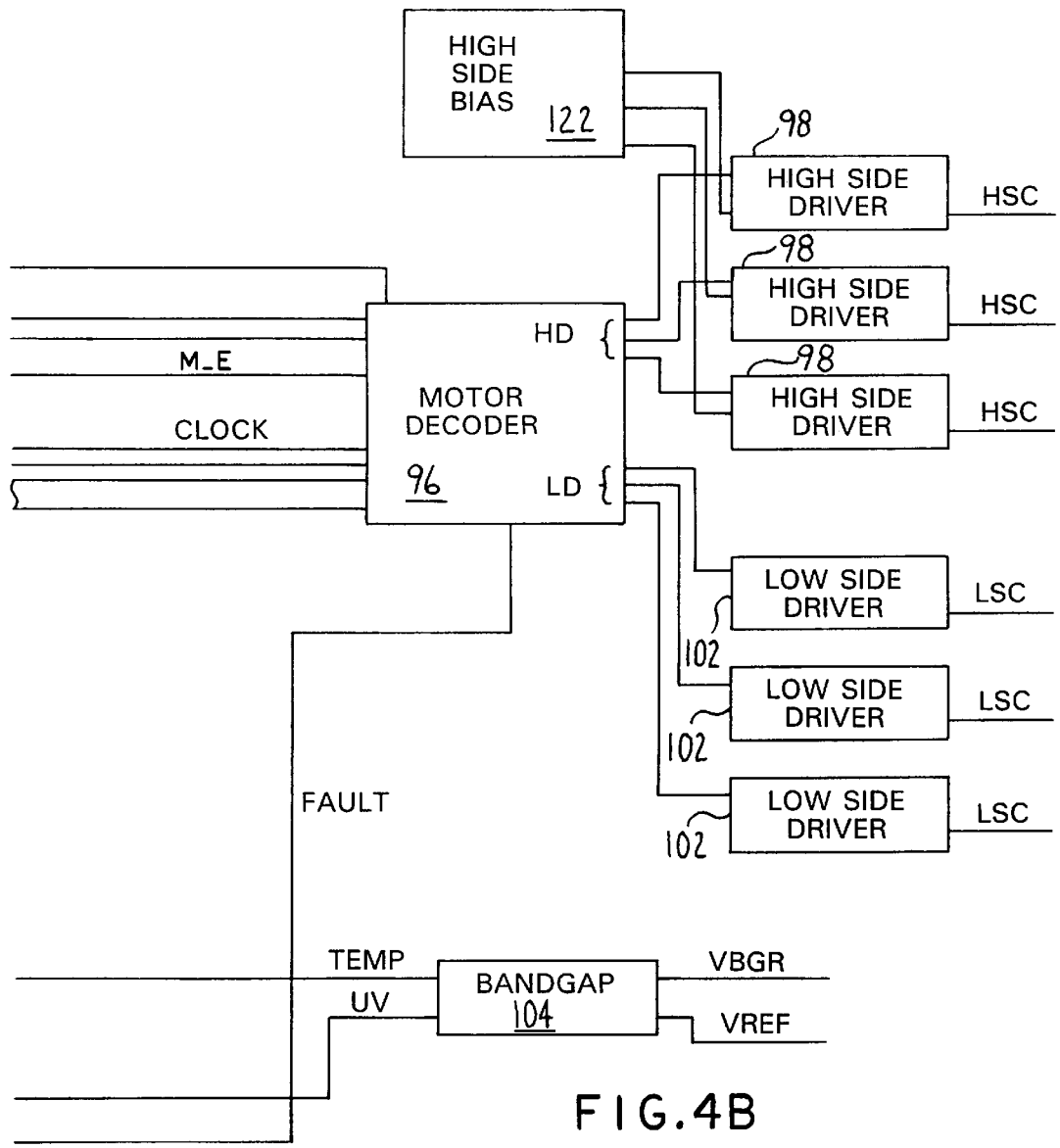

The sub-circuits internal to the motor control chip 62 are now described by reference to FIGS. 4A and 4B. The USER_SPEED signal produced by Hall effect sensor 54 is applied to a pulse width modulator 90. The pulse width modulator 90 also receives a TACHOMETER$_{PWM}$ (TACH$_{PWM}$) signal, based on the speed of the motor rotor 66. Pulse width modulator 90, based on the USER_SPEED and TACH$_{PWM}$ signals, produces an SPEED_CONTROL$_{PWM}$ (S_C$_{PWM}$) signal in pulse-width modulated format. The SPEED_CONTROL$_{PWM}$ signal is representative of the extent the rotor should be accelerated in order to maintain its speed at the speed represented by the USER_SPEED signal. Pulse width modulator 90 also produces a BRAKE_ENABLE (B_E) signal whenever the SPEED_CONTROL$_{PWM}$ signal indicates the rotor is spinning faster than the user-desired speed and the rotor should be decelerated.

A forward/reverse oscillator 92 generates the signals that are used to regulate the direction in which the motor rotor 66 is turned. The FORWARD and REVERSE signals produced by Hall sensors 48 and 50, respectively, and the HALL A and C signals produced by two of the motor-mounted Hall sensors 65 are applied to forward/reverse oscillator 92. In response to these inputs, forward/reverse oscillator 92 produces a FORWARD/REVERSE, (F/R) signal representative of the direction in which the rotor should be turned.

The BRAKE_ENABLE signal is also applied to the forward/reverse oscillator 92. The forward/reverse oscillator then selectively asserts a BRAKE_ON (B_O) signal based on the state of the BRAKE_ENABLE signal and the state of the motor rotor 66 as represented by the HALL A and C signals. Forward/reverse oscillator 92 also generates other signals that regulate the application of energization voltages to the motor when the tool 20 is operated in the oscillating mode.

The HALL A, B and C signals from motor-mounted Hall sensors 65 are applied to a tachometer 94. Tachometer 94 produces the TACHOMETER$_{PWM}$ signal representative of speed of the motor rotor 66 that is applied to the pulse width modulator 90.

A motor decoder 96 produces the actual drive signals upon which the HIGH_and LOW_SIDE_CONTROL signals are based. The SPEED_CONTROL, FORWARD/REVERSE, BRAKE_ON and HALL A, B, and C signals are applied to the motor decoder 96. The motor decoder 96 also monitors a signal representative of the current drawn by the motor 24. Based on these inputs, motor decoder 96 asserts HIGH_and LOW_DRIVER (HD, LD) signals. The HIGH_DRIVER signals are applied to high side drivers 98. Each high side driver 98 asserts a specific one of the high voltage HIGH_SIDE_CONTROL signals required to turn on one of the FETs 70. The LOW_DRIVER signals produced by motor decoder 96 are supplied to individual low side drivers 102. Each low side driver 102 produces one of the LOW_SIDE_CONTROL signals that turns on one of the FETs 76.

Motor control chip 62 also includes a bandgap circuit 104. Bandgap circuit 104 provides temperature-independent constant current/constant current reference signals to the other circuits internal to motor control chip 62. Specifically, bandgap circuit 104 includes a set of FETs (not illustrated) that are interconnected together to function as temperature-independent constant current sources. The current produced by one of the constant current sources is applied to ground through three series-connected off-chip resistors 106, 107 and 108 (FIG. 3A). Thus, the voltages across resistors 106, 107 and 108 are temperature-independent constant voltage signals. A first one of these signal is a V$_{REF}$ signal; this is the signal present across resistors 106, 107 and 108. The second reference signal is a V$_{BGR}$ signal; this is the signal present at the junction of resistors 106 and 107.

Two other signals produced by bandgap circuit 104 are TEMP and UNDERVOLTAGE (UV) signals. The TEMP signal represents the temperature internal to the motor control chip 62 and is produced by a network of bipolar transistors and resistors internal to chip 62 that produce a temperature-dependent signal. The UNDERVOLTAGE signal is produced by a bipolar transistor and resistor network internal to the bandgap circuit whenever the onchip V$_{cc}$ voltage goes below 6 VDC. In the depicted version of the invention, the UNDERVOLTAGE signal is asserted low. The UNDERVOLTAGE signal is applied to one input of a NAND gate 110 through an inverting Schmidt trigger 109.

The above discussed TEMP signal is applied to the inverting input of an on-chip comparator 112. A reference signal based on the V$_{BGR}$ signal from the bandgap circuit is applied to the noninverting input of comparator 112. Specifically, the V$_{BGR}$ is applied to a voltage divider consisting of on-chip resistors 114 and 116. The signal present at the junction of resistors 114 and 116 is applied to the noninverting input of comparator 112. The output of the comparator 112 is applied to the second input of NAND gate 110. Bandgap circuit 104 also produces a constant current signal (output for this signal not identified). This signal is applied to on-chip current mirrors, (not identified). The output currents from these current mirrors are applied to the other components internal to the chip 62.

If either the UNDERVOLTAGE signal is asserted, or the TEMP signal rises above the complementary reference signal, NAND gate 110 asserts a low signal. The output of NAND gate 110 is inverted by an invertor 118 and applied to the motor decoder as a FAULT signal. This FAULT signal is asserted low.

Motor controller chip 62 also includes a high side bias circuit 122. The high side bias circuit provides the high voltage output signals used to turn on the high side FETs 70.

Figure 5:
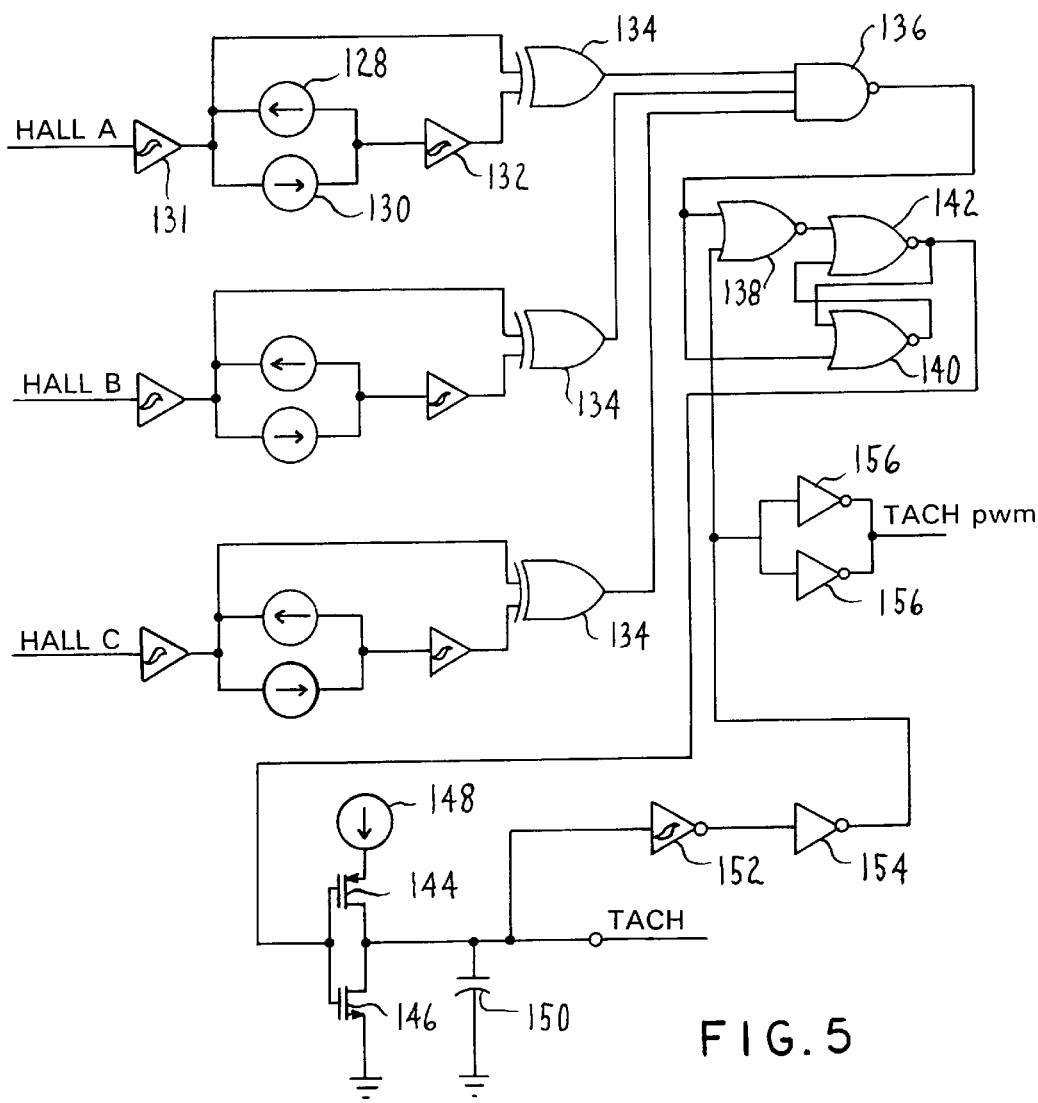
FIG. 5 is a schematic diagram of the tachometer internal to the motor control chip.

The tachometer 94 is now described by reference to FIG. 5. The HALL A, B and C signals are applied to separate delay circuits. As shown by reference to the delay circuit to which the HALL A signal is applied, each delay circuit a noninverting Schmidt trigger 131 to which the HALL signal. The output signal from Schmidt trigger 131 is applied to two current sources 128 and 130. Each current source 128 and 130, as are the other current sources fabricated into motor control chip 62, is constructed out of one or more FETs. In one preferred version of the invention, tachometer 94 also has a set of FETs, (not illustrated,) that multiply the rail current to apply a current to current sources 128 and 130. In this version of the invention, current sources 128 and 130 each discharge approximately 360 μA of current. Current sources 128 and 130 are arranged in parallel. When the HALL A signal is asserted, current source 130 current source functions as current source that flows current in the direction opposite Hall sensor 65; current source 128 is turned of in this state. When the HALL A signal is negated, current source 130 is turned off; current source 128 serves as a sink for current flowing from the other components of the tachometer 94 to the Hall sensor 65. The ends of currents sources 128 and 130 opposite there ends connected to receive the HALL A signal are connected to a noninverting Schmidt trigger 132.

Schmidt triggers 131 and 132, it should be understood, are formed out of on-chip FETs with large gate capacitance. For example, the Schmidt triggers 131 and 132 are from pMOS FETs having a gate capacitance of between 270 and 430 fento Farads and nMOS FETs having a gate capacitance of 410 to 570 fento Farads.

Collectively, current sources 128 and 130 and Schmidt triggers 131 and 132 produce output pulses that are a slightly delayed version of the HALL A signal pulses. In some versions of the invention these pulses are delayed from the pulses on which they are based by 20 to 200 nano seconds.

Both the HALL A signal and the delayed version of the HALL A signal from Schmidt trigger 132 are applied to the inputs of an XOR gate 134. Consequently, the delay circuit and the XOR gate 134 function as an edge detector circuit that produces output pulses each time the HALL A signal undergoes a state transition. Thus, XOR gate 134 produces a pulse stream at twice the frequency at the rate at which the pulses appear as the HALL A signal.

The pulse signals produced by the three XOR gates 134, one for each HALL signal, are applied to a 3-input NAND gate 136. The NAND gate 136 produces an output pulse train that represents the sum of the three sets of input pulses produced by the XOR gates 134. The pulse train generated by NAND gate 136 is applied to the inputs of two two-input NOR gates 138 and 140. The output signals from NOR gates 138 and 140 are applied to the inputs of a third two-input NOR gate, gate 142. The remaining input into NOR gate 140 is the output of NOR gate 142; the remaining input into NOR gate 142 is the output signal from NOR gate 140. Collectively, NOR gates 138, 140 and 132 form a S/R flip flop. The pulse train generated by NAND gate 136 function as the set signal into the flip flop. The source of the reset signal, the second input into NOR gate 138, will be discussed hereinafter.

The output signal produced by NOR gate 142 controls the setting of two switches, represented by series-connected FETs 144 and 146. In FIG. 5, FET 144 is shown as a p-channel FET; FET 146 is an n-channel FET. The drain of FET 144 is connected to receive the output signal from an on-chip current source 148. Thus, depending on the state of the signal produced by NOR gate 142 the junction of FETs 144 and 146 is either connected to current source 148 or tied to ground. In some preferred versions of the invention, multiple FETs 144 are provided in parallel in order to provide a low impedance path between current source 148 and the junction of FETs 144 and 146. Similarly, multiple FETs 146 are provided in parallel order to provide a low impedance path between the junction of FETs 144 and 146 and ground.

An off-chip timing capacitor 150 is connected between the junction of FETs 144 and 146 and ground. The signal present across timing capacitor 150 is a TACHOMETER (TACH) signal representative of motor speed. The signal across capacitor 150 is also applied to an on-chip inverting Schmidt trigger 152. The output signal from the Schmidt trigger 152 is applied to an invertor 154. The output signal from invertor 154 is applied to the second input of NOR gate 138 as the reset signal into the flip flop. The output signal produced by invertor 154 is also applied as the input to two parallel connected invertors 156. The output signals of invertors 156 are tied together and function as the TACHOMETER$_{PWM}$ signal. Thus, the TACHOMETER$_{PWM}$ is a digital version of the TACHOMETER signal in which the percent of time the on signal is asserted is proportional to rotor speed. (In FIG. 5 the conductor through which the TACHOMETER signal flow extends from capacitor 150. This conductor is connected to a test pad, not illustrated, so as to allow for off-chip measurement of the TACHOMETER signal.)

Figure 6A:
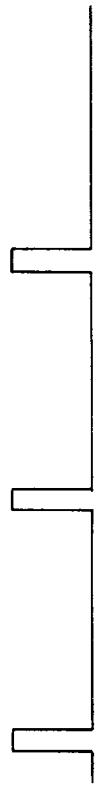
FIGS. 6A, 6B, 6C, 6D, 6E and 6F are timing diagrams of some of the signals produced by the tachometer.

With this description of the construction of the tachometer 94, its operation while now be explained. Initially, it should be understood that the on/off periods of the HALL A, B and C signals overlap as the motor rotor 66 turns. During the times when the motor rotor 66 is turning relatively slowly, because the time periods the HALL A, B, and C signals are in the same state and overlap are relatively long, there is a relatively wide time periods between when the NAND gate 136 asserts high signal pulses as represented by FIG. 6A. At the end of each logical high signal pulse produced by NAND gate 136, NOR gate 142 is latched into asserting a low signal pulse. The assertion of the logical low signal pulse by NOR gate 142 turns on FET 144 and turns off FET 146. The switching on of FET 144 and the switching off of FET 146 causes current from current source 148 to charge capacitor 150 as seen by charge line 157 in FIG. 6B.

As a result of the voltage across timing capacitor 150 rising, after a delay period, the signals produced by Schmidt trigger 152 changes state. The inverted version of this signal produced by invertor 154 is applied to NOR gate 138 as a reset signal. The application of this reset signal to NOR gate 138 results in NOR gate 142 transitioning to produce a high signal. The high signal produced by NOR gate 142 turns off FET 144 and turns on FET 146. The turning off of FET 144 and turning on of FET 146 results in the rapid discharge of the charge held by capacitor 150. This discharge is represented by line 158 in FIG. 6B.

Figure 6B:
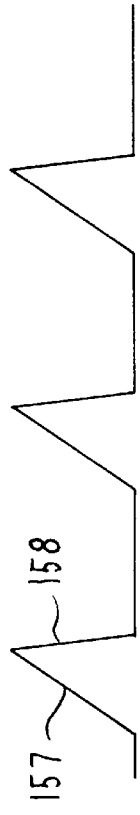
Figure 6C:
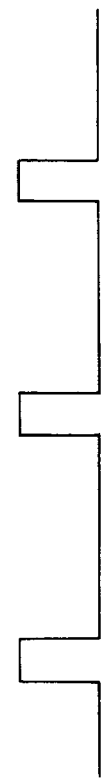

Eventually, the voltage across timing capacitor 150 drops to a level that the output signal produced by Schmidt trigger 152 changes state. This results in a complementary transition of the output signal produced by invertor 154 to take the NOR gates 138, 140 and 142 flip flop out of the reset mode. Consequently, the next time NAND gate 136 produces a high pulse, NOR gate 142 will assert a now low signal pulse to cause the production of a new sawtooth wave. As seen by FIG. 6B, since there is a relatively wide time gap between when NAND gate 136 asserts high pulses, there is a significant time gap between when the sawtooth pulses that form the TACHOMETER signal are produced.

The signal produced by invertor 154 is applied to invertors 156. Consequently, invertors 156 produce the TACHOMETER$_{PWM}$ pulses that are likewise spaced apart as a function of speed of the motor rotor 66. produces a low/high signal that is applied to NOR gate 138.

Figure 6D:
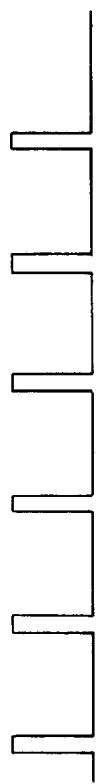
Figure 6E:
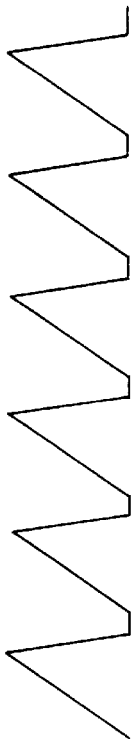
Figure 6F:

When the motor rotor 22 is spinning rapidly, the HALL A, B and C signals from Hall sensors 65 have shorter high/low signal state cycles. Consequently, the time period between which NAND gate 136 produces high signal output pulses is relatively short as represented by FIG. 6D. The shortening of the time period between when NAND gate 136 produces pulses results in a shortening of the time between when sawtooth waves forming the TACHOMETER signal appear across capacitor 150 as represented by FIG. 6E. As represented by FIG. 6F, the spacing between when invertors 156 produce each TACHOMETER$_{PWM}$ pulse likewise decreases. Thus, the overall percent of time the TACHOMETER$_{PWM}$ signal is pulsed on is directly proportional to the speed of the motor 24.

Figure 7:
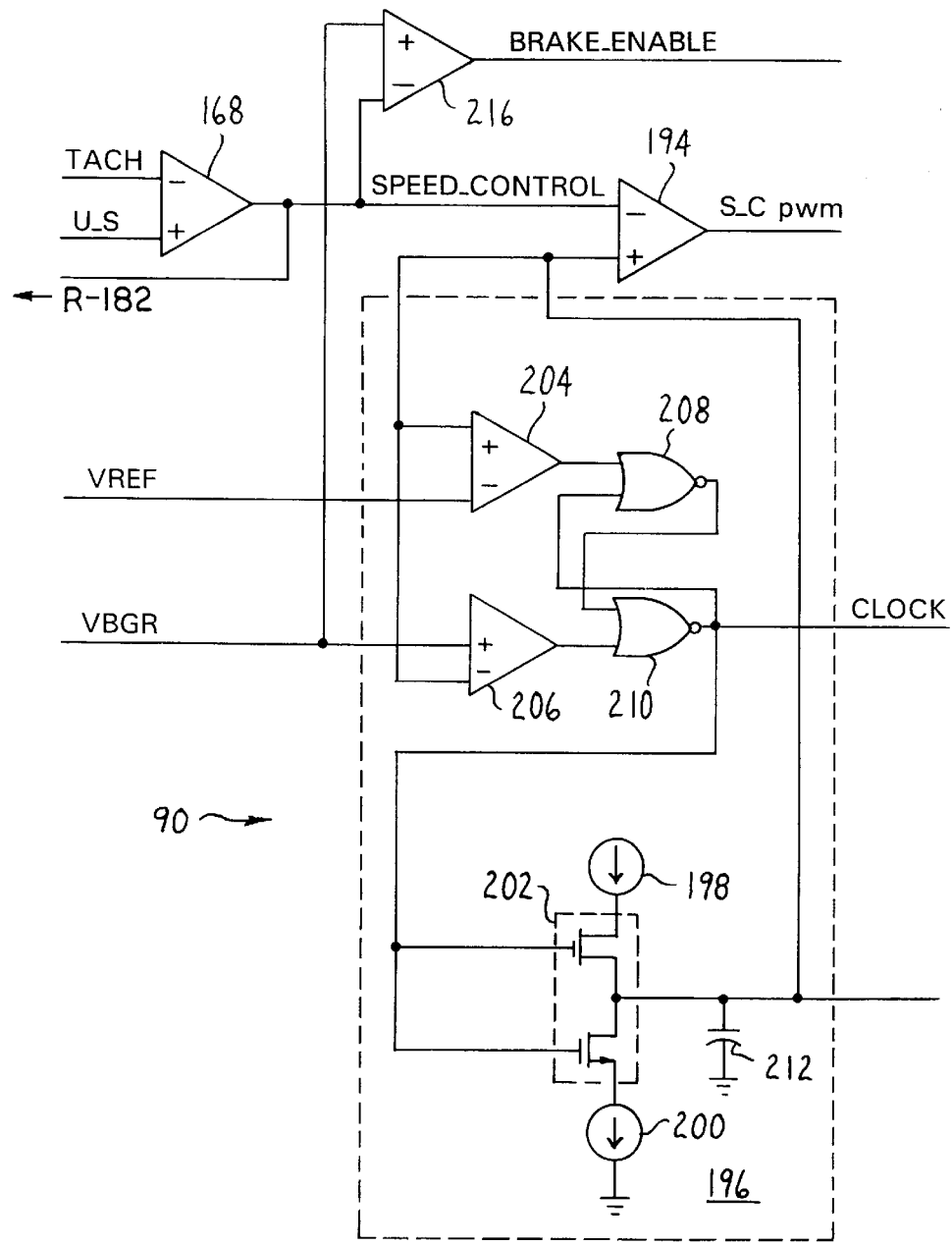
FIG. 7 is a schematic drawing of the pulse width modulator internal to the motor control chip.

The USER_SPEED and the TACHOMETER$_{PWM}$ signal are applied to the inputs of an operational amplifier 168 integral with the pulse width modulator 90 now described by reference to FIGS. 3A and 7. Specifically, the USER_SPEED signal is applied to the noninverting input of operational amplifier 168 through off-chip resistor 63. The TACHOMETER$_{PWM}$ signal is applied to the inverting input of amplifier 168 through off-chip resistor 174. It will further be noted that a fixed offset voltage is applied to the inverting input of amplifier through resistors 176, 178 and 180. Specifically, resistors 176 and 178 form a voltage divider between a $V_{CC}$ voltage source and ground. The voltage present at the junction of resistors 176 and 178 is applied to the inverting input of amplifier 168 through resistor 180.

The output signal of amplifier 168 is also applied to the noninverting input. In the depicted version of the invention this signal is feedback to the input through parallel-connected, off-chip resistor 182 and capacitor 184. This feedback loop integrates the TACHOMETER$_{PWM}$ signal. Operational amplifier thus produces the SPEED_CONTROL signal which is a function of both the USER_SPEED signal and the difference between the USER_SPEED signal and the motor speed as represented by the TACHOMETER$_{PWM}$ signal.

The SPEED_CONTROL signal is applied to the inverting input of a comparator 194. A triangle wave is applied to the noninverting input of comparator 194. The triangle wave comes from a triangle wave oscillator 196 also part of the pulse width modulator 90. Triangle wave oscillator 196 has a current source 198 and a current sink 200. A two FET invertor 202 is located between the source 198 and the sink 200. The input signal into invertor 202 comes from comparators 204 and 206 and 2-input NOR gates 208 and 210. The input into the inverting input of each comparator 204 is the $V_{REF}$ signal from the bandgap circuit 104. The input into the noninverting input of comparator 206 is the $V_{BGR}$ signal from the bandgap circuit 104. The input signal into the noninverting input of comparator 204 and the inverting input of comparator 206 is the triangle wave signal produced by the oscillator 196. The output signal produced by comparator 204 is applied to one input of NOR gate 208. The output signal produced by comparator 206 is applied to one input of NOR gate 210. The output signal of NOR gate 208 is applied to the second input of NOR gate 210. The output signal produced by NOR gate 210 is applied to both the second input of NOR gate 208 and the gates of the FETs forming invertor 202. The signal present at the junction of the FETs forming invertor 202, the output of the invertor, is applied to an off-chip capacitor 212 that is tied to ground. This signal, because of the linear charging and discharging of the capacitor 212, is the triangle wave output signal of oscillator 196. (In FIG. 7, an unattached conductor is shown extending from capacitor 212. This conductor is connected to a test pad, not illustrated, to allow measurement of the signal across conductor 212.)

It will also be noted that NOR gate 210 produces a fixed period CLOCK signal. The on-chip components to which the CLOCK signal is applied will be discussed hereinafter.

As discussed above, the triangle wave output signal from oscillator 196 is applied to the noninverting input of comparator 194. Thus, comparator 194 produces a pulsed SPEED_CONTROL$_{PWM}$ signal in which the width of the pulses, the on duty cycle, is related to the difference between the user-selected speed and the measured speed of the motor 24. More particularly, the time period of the logical low pulses is directly proportional to period of time the motor should be energized.

Pulse width modulator 90 also includes a second comparator 216. The SPEED_CONTROL signal is applied to the inverting input of comparator 206. A fixed reference signal is applied to the noninverting input of comparator 206. In the depicted version of the invention, this fixed signal is the $V_{BGR}$ from the bandgap circuit. The $V_{BGR}$ signal is applied to comparator 216 through an off chip conductor (not identified). This arrangement makes it possible to provide other reference signals to the noninverting input of comparator 216.

Whenever the SPEED_CONTROL signal is below the reference signal into comparator 216, the comparator asserts the BRAKE_ENABLE signal which is asserted high. At other times, comparator 216 does not assert the BRAKE_ENABLE signal.

Figure 8:
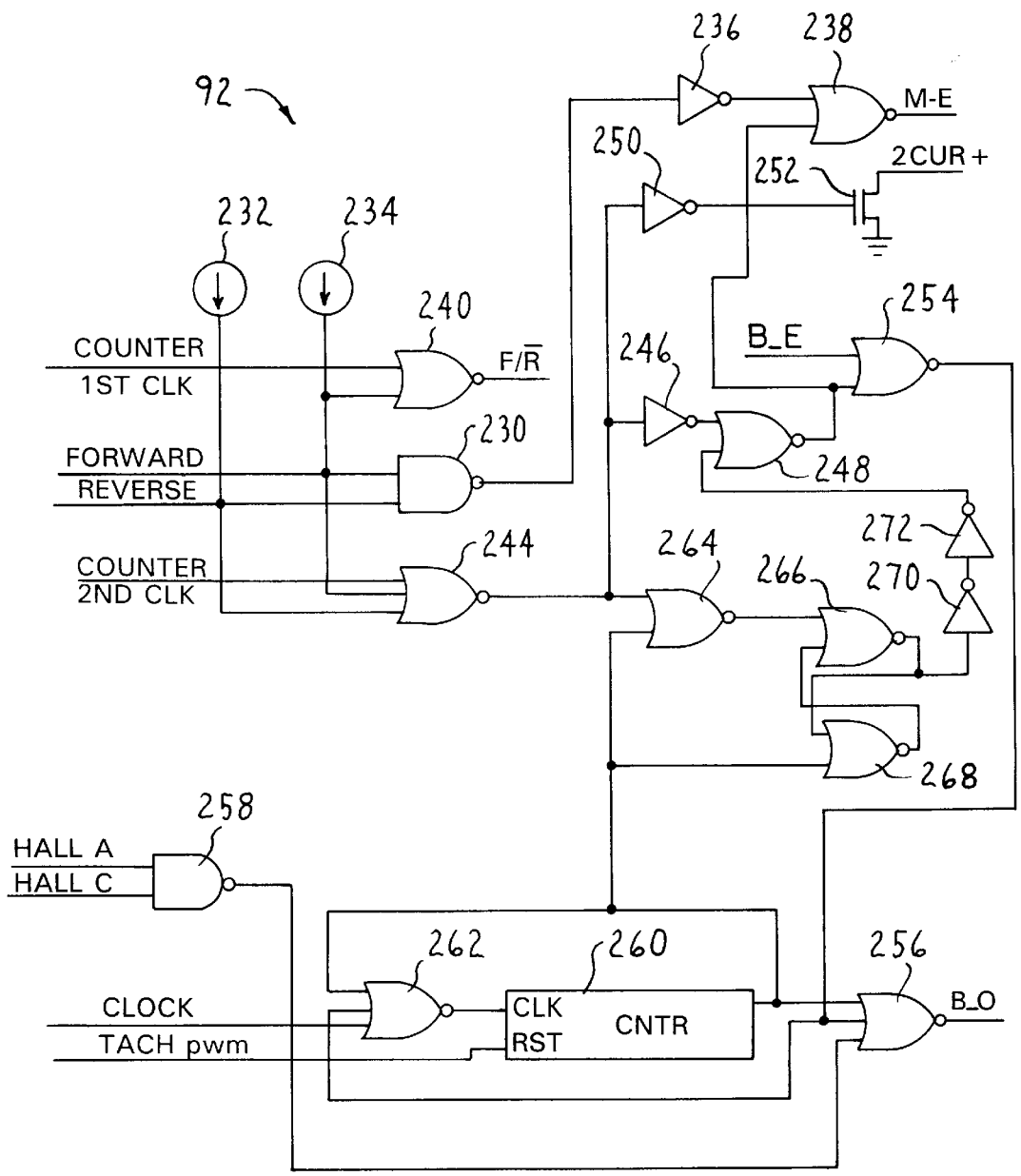
FIG. 8 is a schematic drawing of the forward/reverse oscillator internal to the motor control chip.

The FORWARD and REVERSE signals from Hall sensors 48 and 50, respectively, are applied to the forward/reverse oscillator 92, now described by reference to FIG. 8. The FORWARD and REVERSE signals are applied to the separate inputs of a 2-input NAND gate 230. Signals from separate on-chip current sources 232 and 234 are also applied to the inputs of NAND gate 230. Each Hall sensor 48 and 50 is normally turned off. Thus, when neither trigger switch 36 nor 38 is depressed, current sources 232 and 234 presents high signals to both inputs of NAND gate 230. The NAND gate 230 thus asserts a low-state output signal. When either trigger switch 36 or 38 is actuated, the displacement of the associated magnet 46 turns on the associated Hall sensor 48 or 50. The turning on of the Hall sensor 48 or 50 causes the associated input signal to NAND gate 230 to go low. This signal transition causes the NAND gate 230 to assert a high-state output signal.

The output signal produced by NAND gate 230 is applied to an invertor 236. The signal produced by invertor 236 is applied to one input of a two-input NOR gate 238. The NOR gate 238 produces a MOTOR_ENABLE (M_E) signal which is applied to the motor decoder 94. The MOTOR_ENABLE signal is the primary "motor on" signal received by the motor decoder that indicates the motor decoder should assert the HIGH_and LOW_DRIVER signals that cause the energization signal to be applied to the motor windings 74.

It will be observed that, when neither trigger switch 36 nor 38 is depressed, high signals are present at both inputs into NAND gate 230. Thus NAND gate 230 outputs a low signal which is inverted high by invertor 236. Since this high signal is applied to one of the inputs into NOR gate 238, the NOR gate 238 asserts a low, $\overline{\text{MOTOR\_ENABLE}}$, signal to the motor decoder 94. As discussed hereinafter, the receipt of the $\overline{\text{MOTOR\_ENABLE}}$ signal by the motor decoder 94 inhibits the motor decoder from asserting the signals that cause energization signals from being applied to the windings 74.

The FORWARD signal produced by Hall sensor 48 is also applied as an input to a 2-input NOR gate 240 also part of the forward/reverse oscillator. The second input to NOR gate 240 is a pulsed signal representative of rotor motion produced by an off-chip counter 242 (FIG. 3A). Specifically, counter 242 receives as input pulses the HALL A signal from a branch line of bus 68. Collectively, these pulses are representative of the incremental rotation of motor rotor 66. The count maintained by counter 242 thus increases at a rate directly proportional to rotor speed. As the rotor 66 turns, the output signal counter 242 applied to NOR gate 240 cycles between the high and low states. The frequency with which this signal transitions is a direct function of rotor speed. It will further be noted that reset pin of counter 242 is connected to receive the output signal produced by Hall sensor 50, the sensor associated with reverse trigger switch 36.

When the persons using the tool 20 depresses trigger switch 38 to run the motor in the forward direction, the change in state of Hall sensor 48 causes a low signal to be presented to NOR gate 240. However, the output signal from Hall sensor 50 does not undergo a state change. Consequently a high, reset signal is applied to the counter 242. This causes the counter 242 to output a low signal to the second input of NOR gate 240. Since low signals are present at both inputs to NOR gate 240, the NOR gate asserts a constant high signal which is forwarded to the motor decoder as a FORWARD/REVERSE signal.

When the tool 20 is run in the reverse direction, the signal produced by Hall sensor 48 does not change state. Thus, a high signal is presented to one input of NOR gate 240 even though the signal produced by Hall sensor 50 does chance state. Since the NOR gate 240 receives at one of input a high-state signal, the NOR gate outputs a low FORWARD/REVERSE signal.

Figure 9:
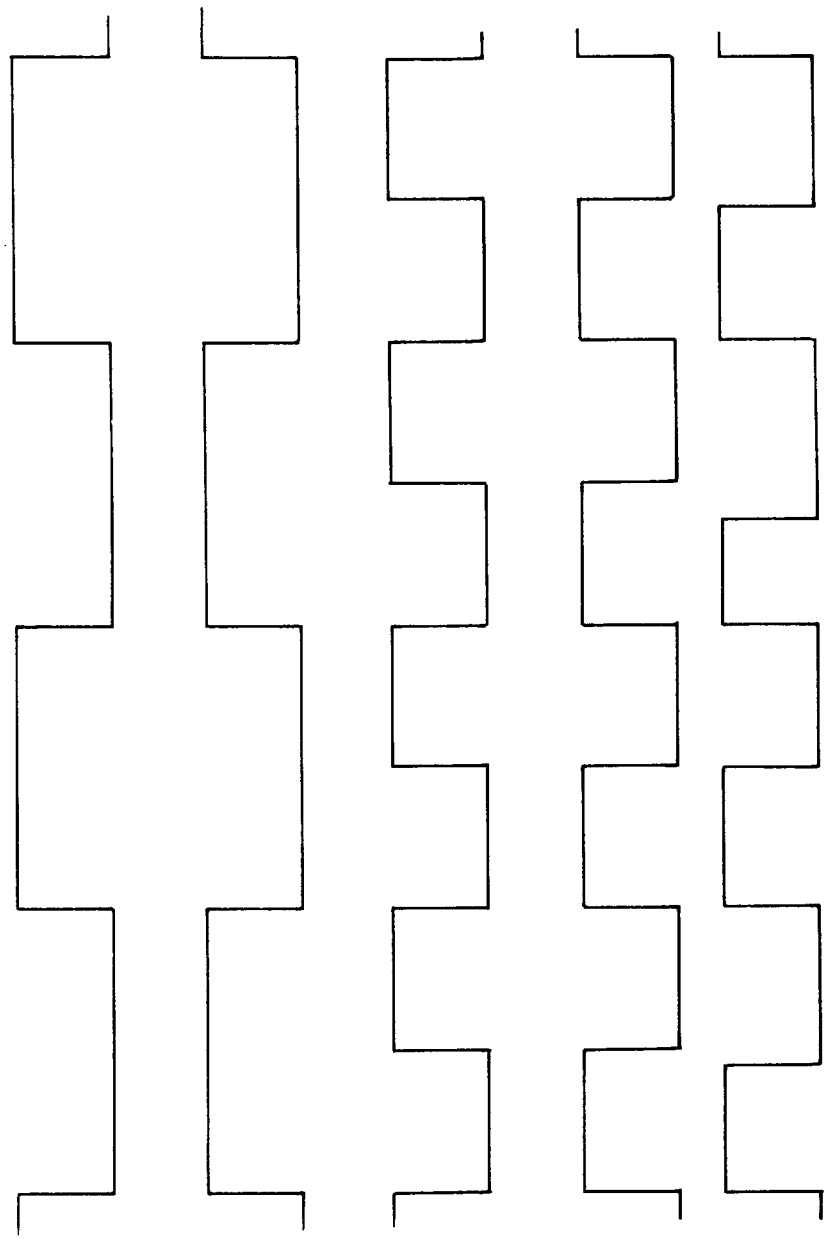
FIGS. 9A, 9B, 9C, 9D and 9E are timing diagrams of some of the signals produced by the forward/reverse oscillator.

When the tool is operated in an oscillatory mode, the signals produced by both Hall sensors 48 and 50 change state. The change in state of the output of Hall sensor 48 causes a low signal to be presented to one input of NOR gate 240. The change in state of the output of Hall sensor 50 takes the counter 242 out of the reset mode. Counter 242 thus produces the first clock signal depicted by FIG. 9A that is applied to the second input of NOR gate 240. Since the first input signal into NOR gate 240 is low, the NOR gate outputs a pulse train of high-low-high-low signals. Thus, as represented by FIG. 9B, when the tool 20 is in the oscillate mode, NOR gate alternatively produces the FORWARD/REVERSE and the FORWARD/REVERSE signals.

Forward/reverse oscillator 92 produces additional signals that regulate the application of the energization and braking signals to the motor 24. In order to produce these signals, the forward/reverse oscillator 92 has a 3-input NOR gate 244. The signals produced by the forward and reverse Hall sensors 48 and 50, respectively, are applied to two inputs of NOR gate 244. The third input into NOR gate 244 is a second clock signal from counter 242. The signal from counter 242 is a pulsed signal that, as represented by FIG. 9C, is pulsed on and off at twice the frequency of the signal applied to the input of, NOR gate 240. It should also be understood from FIGS. 9A and 9C that this second clock pulse is synchronous with the first clock pulse and, during the first half of each period after the first clock pulse changes high/low state, is in the low state.

When neither or only one of the trigger switches 36 is depressed, at least one of the Hall sensors 48 and 50 causes a high signal to be presented at one of the inputs to NOR gate 244. Thus, when the tool 20 is either off or the tool is run in a single direction, NOR gate 244 produces a constant low signal.

When both trigger switches 36 and 38 are depressed to run the tool 20 in the oscillatory mode, the change in state of the output of Hall sensors 48 and 50 cause low-state signals to be presented to two of the inputs to NOR gate 244. Thus, the output signal produced by NOR gate is a function of the third input signal, the second clock pulse from counter 242. Therefore, NOR gate 244 produces an output pulse train represented by FIG. 9D.

The output signal from NOR gate 244 is applied to an invertor 250 and the inverted signal is applied to the gate of a FET 252. The drain of FET 252 is tied to the 2CUR+ terminal; the source of the FET is tied to ground. Since resistor 88 is connected to the 2CUR+ terminal, FET 252 can tie resistor 88 to ground. As discussed above, whenever the tool motor 24 is run in one direction, NOR gate 244 asserts a low signal. This low signal is inverted by invertor 250 so as to turn on FET 252 and tie resistor 88 to ground.

The output signal produced by NOR gate 244 is also applied to an invertor 246 and to one input of a two-input NOR gate 264. The output signal produced by invertor 246 is applied to one input of 2-input NOR gate 248. The output signal produced by NOR gate 248 is applied to the second input of NOR gate 238. As discussed hereinafter, this signal connection causes NOR gate 238 to assert the MOTOR_ENABLE signal for a short period after each FORWARD/REVERSE signal state transition.

NOR gate 264 is part of flip flop that consists of two-input NOR gates 264, 266 and 268. Specifically, the output of NOR gate 264 is applied to one of the inputs of NOR gate 266. The output signal produced by NOR gate 266 is applied to one of the inputs of NOR gate 268. The output signal produced by NOR gate 268 is the second input signal into NOR gate 266. The output signal produced by NOR gate 266 is applied through two invertors 270 and 272 to the second input of NOT gate 248. Invertors 270 and 272 serve as delay buffers for the signal from NOR gate 266 into NOR gate 248.

Forward/reverse oscillator 92 also asserts the BRAKE_ON signal. The BRAKE_ENABLE signal from the pulse width modulator 90 is applied to one input of a two-input NOR gate 254. The second input to NOR gate 254 is the output signal from NOR gate 248. The output signal from NOR gate 254 is applied to one input of a three-input NOR gate 256. The output signal from NOR gate 256 is the BRAKE_ON signal which is asserted high.

The remaining two inputs into NOR gate 256 control the on/off rate at which the BRAKE_ON signal is asserted and serve as a failsafe to prevent the assertion of the BRAKE_ON signal when the motor is not running. Specifically, a second input into NOR gate 256 is the output signal from a NAND gate 258. The input signals into NAND gate 258 are the HALL A and C signals from two of the Hall sensors 65 internal to the motor 24.

The period of the duty cycle at which both the HALL A and C signals are high simultaneously is inversely proportional to motor speed. Thus, whenever the motor rotor 66 is turning slowly, NAND gate 258 asserts low signals for relatively long time periods. Thus, whenever the BRAKE_ENABLE signal is asserted and the rotor 66 is turning relative slowly, NOR gate 256 asserts BRAKE_ON pulses for relatively long periods of time. When motor rotor 66 is turning rapidly, NAND gate 258 asserts low signals for relatively short time periods. Consequently, when the rotor is turning rapidly and the BRAKE_ENABLE signal is asserted, NAND gate 258 asserts the BRAKE_ON signal for relatively short periods.

The third input signal into NOR gate 256 is the output signal from a counter 260. Counter 260, which is integral to motor controller chip 62, is formed from a number of on-chip D-type flip flops. The clock signal into counter 260 is supplied by a three-input NOR gate 262. A first input into NOR gate 262 is the output signal from NOR gate 250. A second input into NOR gate 262 is the output signal from the counter 260. The third input into NOR gate 262 is the CLOCK signal from the pulse width modulator 90. Counter 260 is also connected to the pulse width modulator to receive the TACHOMETER$_{PWM}$ as a reset signal.

The output signal produced by counter 260 is also applied to inputs of NOR gates 264 and 268. Thus, for reasons discussed below, the output signal of counter 260 serves as a reset signal into the flip flop formed by NOR gates 264, 266 and 268.

During uni-directional operation of the tool 20, NOR gate 244 produces a low signal. Invertor 246 thus produces a high signal which causes NOR gate 248 to present a low signal to one of the inputs into NOR gate 250. Thus whenever the high-state BRAKE_ENABLE signal is initially asserted, NOR gate 250 asserts a low signal and the output from the counter 260 is low. Consequently, during this time, NOR gate 262 produces a clock signal at a rate equal to the frequency of the CLOCK signal from the pulse width modulator 90. As long as the motor rotor 66 continues is turning, the pulse width modulator 90 will also assert a $TACHOMETER_{PWM}$ signal. The pulses forming the $TACHOMETER_{PWM}$ signal reset counter 260 so that the counter never asserts a high-state signal indicating it has completed its count. Thus, when the counter 260 is in this state, the output signal from the counter does not inhibit the assertion of the BRAKE_ON signal by NOR gate 256.

Once the motor rotor 66 stops turning, tachometer 94 stops asserting the pulses forming the $TACHOMETER_{PWM}$ signal. If NOR gate 250 continues to assert a low signal indicating braking force should be applied, the pulses from NOR gate 262 into the counter 262 will likewise continue. Since no reset signals are being applied to counter 260, the counter will reach its maximum count and produce a high signal that is applied to the third input of NOR gate 256. This high state signal causes NOR gate 256 to negate the output of the BRAKE_ON signal regardless of the state of the BRAKE_ENABLE signal (the output signal from NOR gate 250).

The output signal from the counter is applied back to NOR gate 262. Thus, once the counter output goes high, NOR gate 262 is blocked from asserting any more clocking pulses to the counter 260. Since the counter 260 does not receive any more clocking pulses, it produces a constant high state output signal until the motor is reactuated.

When the motor is reactuated, the assertion of the $TACHOMETER_{PWM}$ by the tachometer 94 resets the counter 260. The resetting of counter 260 makes it possible for NOR gate 256 to reassert the BRAKE_ON signal.

When the motor 24 is driven in the oscillatory mode, the forward reverse oscillator 92 asserts a slightly different set of signals to prevent tool vibration or bucking. These signals are asserted because, as discussed above, after each state transition of the FORWARD/REVERSE signal produced by NOR gate 240, NOR gate 244 produces an initial logical high state signal. One of the signals asserted by the forward reverse oscillator 92 is the turning off of FET 252 by invertor 250. The turning off of FET 252 effectively disconnects resistor 88 from the current measuring network for a purpose to be described hereinafter.

Also, the high output signal from NOR gate 244 is applied to invertor 246 which presents a low signal into one of the inputs into NOR gate 248. The output signal from NOR gate 244 is also applied to NOR gate 264. Consequently, NOR gate 266 produces a low signal, which, after a slightly delayed time period, is applied to the second input of NOR gate 248. Thus both inputs into NOR gate 248 are low. NOR gate 248 thus asserts a high signal as represented by FIG. 9E.

The high signal asserted by NOR gate 248 is applied to NOR gate 238. This causes NOR gate 238 to assert the MOTOR-ENABLE signal so as to temporarily prevent the further application of the energization currents to the motor windings.

The high signal asserted by NOR gate 248 is also applied to NOR gate 254. The assertion of this high signal to NOR gate 254 causes the BRAKE_ON signal to be asserted by NOR gate 256 in a manner similar to how it would be asserted if the BRAKE_ENABLE signal had been asserted.

During the initial period of each forward/reverse state when the tool is operated in the oscillation mode, it is anticipated that due to the application of the braking force, the rotor 66 will stop turning. Once this occurs, counter 260 asserts its complete time signal as discussed above. This signal is the second signal applied to the inputs of NOR gates 264 and 268 as a reset signal. This reset signal forces NOR gate 266 to output a high signal.

The outputting of a high signal by NOR gate 266 causes NOR gate 248 to then output a low signal. A first effect of NOR gate 248 outputting a low signal is that it stops NOR gate 254 from asserting the low signal required to cause the assertion of the BRAKE_ON signal. A second effect of NOR gate 248 outputting a low signal is that it allows NOR gate 238 to again assert the MOTOR_ENABLE signal which regulates the basic energization of the motor.

Thus, the exact time at which NOR gate 248 stops asserting a high signal is a function of when the motor rotor 66 stops turning. This variation is shown exaggerated for the purposes of illustration in FIG. 9E. The precise regulating of when the pseudo BRAKE_ENABLE and MOTOR_ENABLE signal are produced by the forward/reverse oscillator 92 during the oscillate mode makes it possible to more precisely regulate the operation of the tool in this mode.

Figure 10:
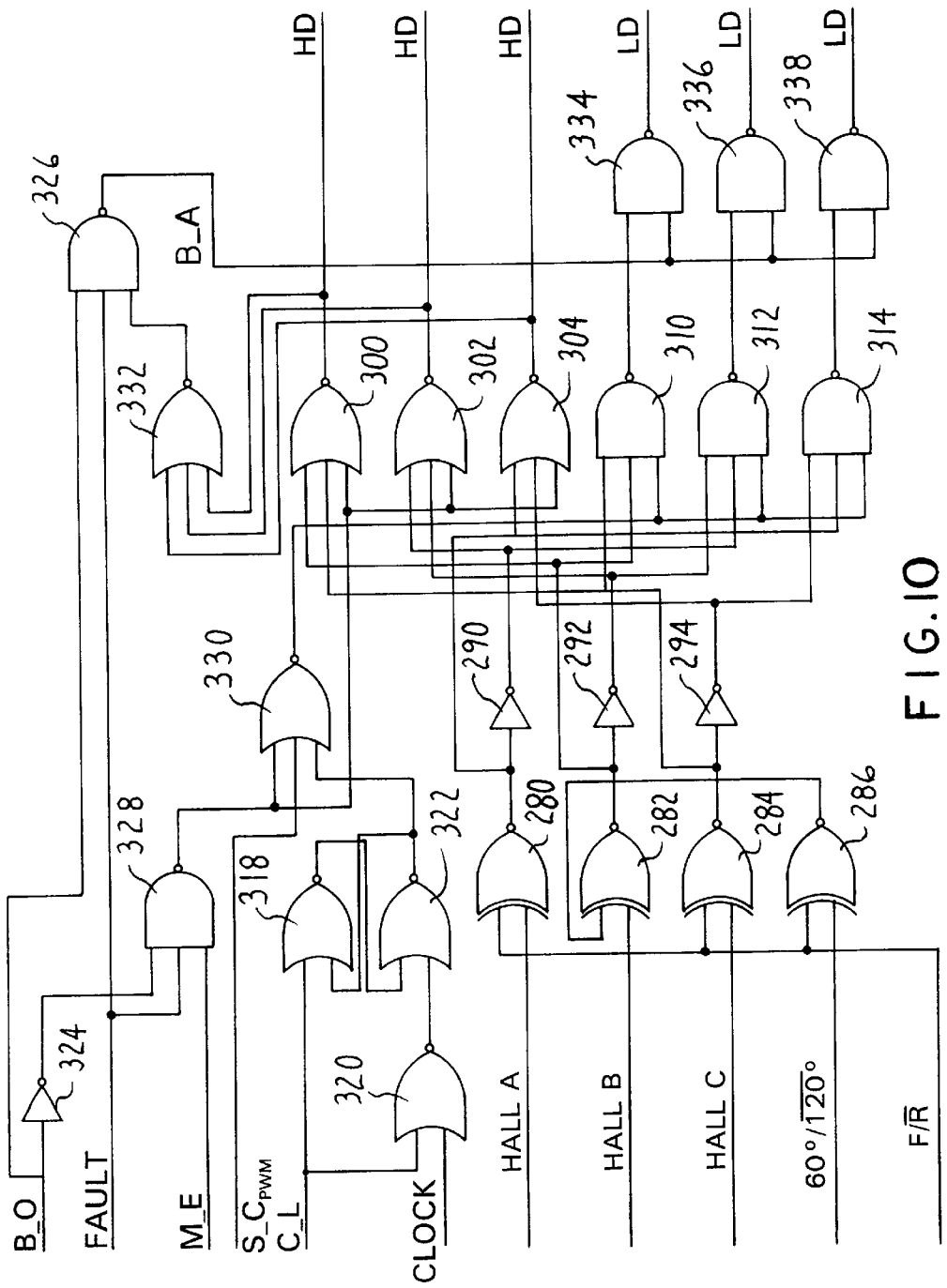
FIG. 10 is a schematic diagram of the motor control circuit internal to the chip.

The motor decoder 96 is now described by reference to FIG. 10. Motor decoder includes three two-input XOR gates 280, 282 and 284. The HALL A, B and C signals from the motor Hall sensors 65 are each applied to a separate one XOR gates 280, 282 and 284, respectively. The XOR gates 280, 282 and 284 are employed to selectively invert the HALL A, B and C signals based on which direction the motor rotor is turning and the angular separation between the Hall sensors. Specifically, a fourth XOR gate 286 is provided, one input to XOR gate 286 is a 60°/120° signal that is set high or low depending on if the angular separation between the Hall sensors 65 in the tool 20 is either 60° or 120°. The output signal produced by XOR gate 286 is employed as the second input signals into XOR gate 282. The FORWARD/REVERSE signal is employed as the second input signal into XOR gates 280, 284 and 286.

Complements of the signals produced by XOR gates 280, 282 and 284 are produced by invertors 290, 292 and 294, respectively. The output signals from XOR gates 280, 282 and 284 and the complements of these signals are applied to three three-input NOR gates 300, 302 and 304 and to three three-input NAND gates 310, 312 and 314. Whenever the motor is to be actuated, NOR gates 300, 302 and 304 produce the individual HIGH_DRIVER signals; NAND gates 310, 312 and 314 produce one of the two signals upon which the LOW_DRIVER signals are based.

More specifically, NOR gates 300, 302 and 304 produce logical high HIGH_DRIVER signals whenever the inputs to each gate are logical low state signals. Two of the inputs into each NOR gate 300, 302 and 304 the signals from XOR gates 280, 282 and 284 and/or their associated invertors 290, 292, and 294. The signals produced by XOR gates 280 , 282 and 284 and invertors 290, 292 and 294 are applied to NOR gates 300, 302 and 304 in such a pattern that each NOR gate 300, 302 and 304 sequentially receives as two input signals two logical low signals. Whether or not the NOR gate 300, 302 or 304 to which the two locical low signals are applied asserts a logical high HIGH_DRIVER signal is a function of the third input signal, the source of which is discussed below.

Similarly, when the BRAKE_ON signal is not asserted, each NAND gate 310, 312 and 314 must assert a logical low signal in order for the motor decoder 96 to assert the logical high LOW_DRIVER signals. For each NAND gate 310, 312 and 314 to assert this logical low state signal, the inputs to the gate must be logical high state signals. The signals produced by XOR gates 280, 282 and 284 and invertors 290, 292 and 294 are applied to NAND gates 310, 312, 314 in such a pattern that each NAND gate sequentially receives as two logical high input signals. Whether or not each NAND gate 310, 312 and 314 upon receiving two logical high input signals asserts a logical low output signal is a function of third input signal which is discussed below.

Motor decoder 96 also receives a number of status signals from other components internal to motor control chip 62. The state of these signals further determines which ones of the HIGH_ and LOW_DRIVER signals are asserted. A first one of the status signals received by motor controller 96 is a CURRENT_LIMIT (C_L) signal. The CURRENT_LIMIT signal is generated by an on-chip comparator 316 depicted in FIG. 4A. The non-inverting input of comparator 316 is connected to a terminal of motor control chip 62 to receive the CUR+ signal present at the junction of resistors 84 and 86. An off-chip CUR-reference signal is applied to the inverting input of comparator 316. In the depicted version of the invention, the CUR-signal is the signal present at the junction of off-chip resistors 107 and 108.

Comparator 316, by monitoring the magnitude of the CUR+ signal, monitors the current drawn by the motor 24. In the event the level of the CUR+ signal exceeds the level of the CUR-signal, comparator 316 asserts a high CURRENT_LIMIT signal to motor decoder 96.

The CURRENT_LIMIT signal is applied to the inputs of two separate two input NOR gates 318 and 320. The output of both NOR gates 318 and 320 are applied as input into a NOR gate 322. The second input into NOR gate 318 is the output signal from NOR gate 322. The second input into NOR gate 320 is the pulsed CLOCK signal from the pulse width modulator 90. Collectively, NOR gates 318, 320 and 322 function as a flip-flop for purposes explained hereinafter.

Another one of the status signals applied to motor decoder 96 is the BRAKE_ON signal from the forward/reverse oscillator 92. The BRAKE_ON signal is applied to an invertor 324 and to one input of a three-input NAND gate 326. The output signal from invertor 324 is applied to one of the inputs of a second three-input NAND gate 328. The FAULT signal from invertor 118 is also applied to the motor decoder 96. The FAULT signal is applied as an input signal to both NAND gate 326 and NAND gate 328. The MOTOR_ENABLE signal is the third input signal applied to NAND gate 328.

The last of the status signals received by motor decoder 96 is the SPEED_CONTROL$_{PWM}$ signal. The SPEED_CONTROL$_{PWM}$ is applied to one of the inputs into a three-input NOR gate 330. A second input into NOR gate 330 is the signal produced by NOR gate 322. The third input into NOR gate 330 is the signal produced by NAND gate 328. The output signal produced by NAND gate 328 is the third input signals also applied to NOR gates 300, 302 and 304.

Motor decoder 96 also includes a three-input NOR gate 332. NOR gate 332 receives as input signals the three HIGH_DRIVER signals produced by NOR gates 300, 302 and 304. The output signal produced by NOR gate 332 is the third input signal into NAND gate 326. The output signal produced by NAND gate 326 is applied as an input signals into three two-input NAND gates 334, 336 and 338. The second input signals into NAND gates 334, 336 and 338 are the output signals produced by NAND gates 310, 312 and 314, respectively. The output signals produced by NAND gates 334, 336 and 338 are the LOW_DRIVER signals.

It should be understood that, when the BRAKE_ON signal is not asserted, NAND gate 326 asserts a high signal. This high signal is applied to the inputs of NAND gates 334, 336 and 338. Thus, whether or not each NAND gate 334, 336 or 338 produces a high state LOW_DRIVER signal becomes a function of the output signal received from the associated NAND gate 310, 312 or 314, respectively.

During normal operation of the tool 20, an inverted version of the $\overline{\text{BRAKE\_ON}}$ signal, the $\overline{\text{FAULT}}$ signal and the MOTOR_ENABLE signals are all presented to NAND gate 328. Since these signals are logical high signals, NAND gate 328 asserts a low signal. The receipt of this low signal by NOR gates 300, 302, 304 serves as a primary control signal that indicates the gates can, at the appropriate times, sequentially assert the high state HIGH_DRIVER signals.

The output signal produced by NOR gate 330 is applied as a third input signal into the NAND gates 310, 312 and 314. During normal operation of the tool 20, NAND gate 328 asserts its logical high signal to one of the inputs of NOR gate 330. Also at this time, since the motor is drawing a current below its programmed limit, NOR gate 322 also provides a low signal to a second input of NAND gate 330. Thus, the state of the output signal produced by NAND gate 330 is a function of the high/low state of the SPEED_CONTROL$_{PWM}$ from the pulse width modulator 90. When the SPEED_CONTROL$_{PWM}$ signal is in the high state, NAND gate 330, outputs a high state signal. Thus, regardless of the state of the other inputs into NAND gates 310, 312 and 314, NAND gates 310, 312 and 314 produce logical high state signals. These logical high state signals are applied to the inputs of NAND gates 334, 336 and 338. When the BRAKE_ON signal is negated, as discussed above, the second inputs into NAND gates 334, 336 and 338 are logical high state signals. Thus, when these two high state signals are presented to NAND gates 334, 336 and 338, these gates assert low state $\overline{\text{LOW\_DRIVER}}$ signals.

However, when the SPEED_CONTROL$_{PWM}$ signal is in the logical low state, assuming the other input signals into the NOR gate 330 maintain their low states, NOR gate 330 produces a logical high signal. Thus, when the other two inputs into one of the NAND gates 310, 312 and 314 are logical high signals, that NAND gate asserts a low signal. The assertion of the logical low signal by one of the NAND gates 310, 312 and 314 causes the associated NAND gate 334, 336 and 338, respectively, to assert the logical high, LOW_DRIVER signal.

Figure 11:
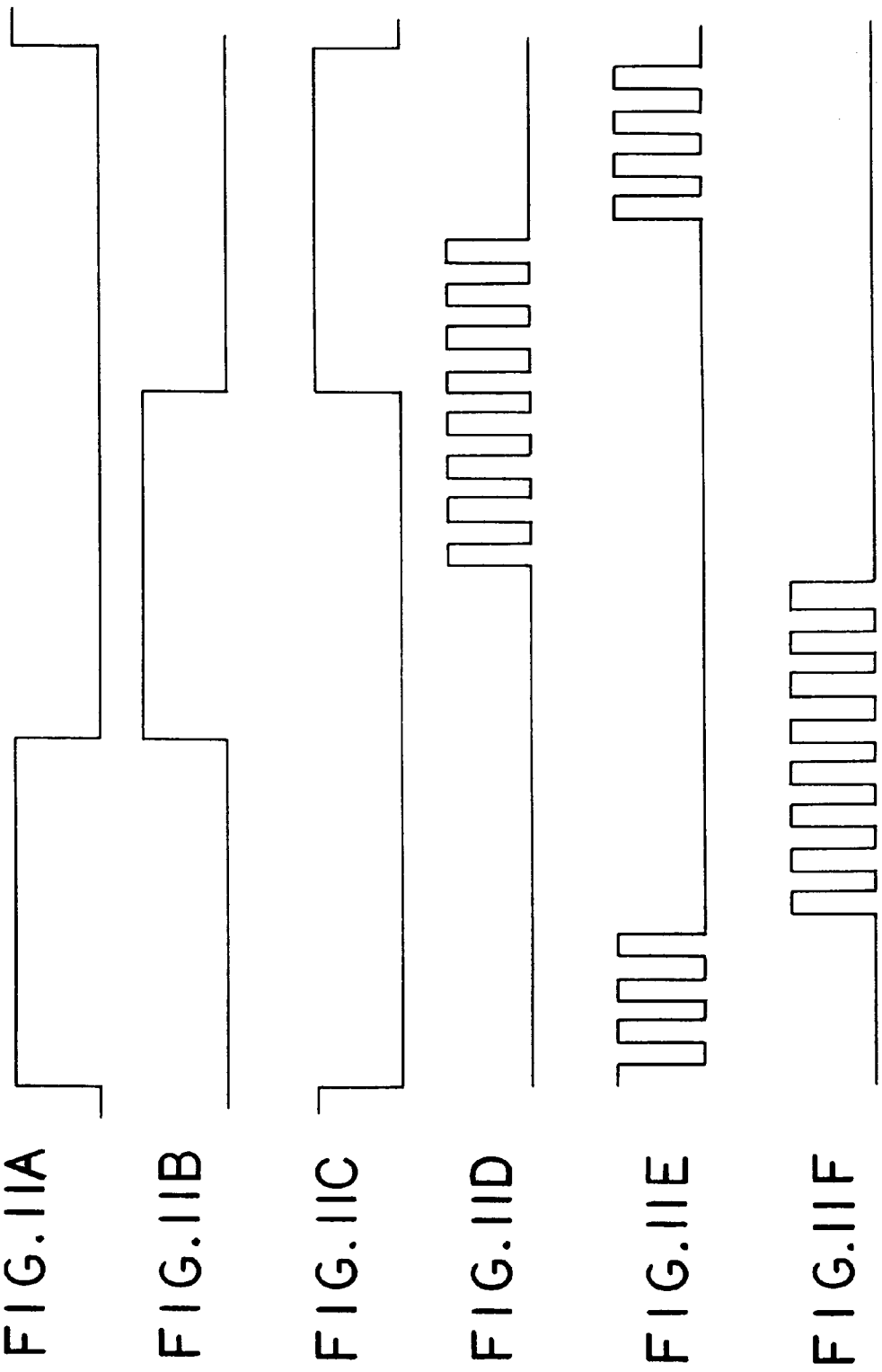
FIGS. 11A, 11B, 11C, 11D, 11E and 11F are timing diagrams depicting which the signals the motor control circuit generates to selectively tie each winding to ground or to the power supply in order to cause the commutation of the motor rotor.

During normal, brake-off, operation of the tool, motor decoder 96 asserts the HIGH_ and LOW_DRIVER signals in the pattern depicted by FIGS. 11A–11F. Specifically, for each 120° rotation of motor rotor 66, the signals present on the Hall sensors 65 cause logical low signals to be presented to just one of the NOR gates 300, 302 and 304. As a result, that NOR gate 300, 302 and 304 asserts a HIGH_DRIVER signal. As discussed hereinafter, this results in the FET 70 associated with that NOR gate 300, 302, or 304 turning on so as to tie the associated winding 74 to the positive contact 76. Thus FIGS. 11A, 11B and 11C depict when, respectively, NOR gates 300, 302 and 304 assert the HIGH_DRIVER signal required to turn on the FET 71 with which each gate is associated.

At the same time, one of the windings is tied to receive the positive voltage signal, the two other windings are sequentially tied to ground. More specifically, as represented by FIGS. 11D, 11E and 11F, whenever one winding is tied to the voltage source, for the first half of that cycle a second one of the windings is tied to ground. Then, for the second half of that cycle, the third winding is tied to ground.

This is occurs because XOR gates 280, 282 and 284 and invertors 290, 292 and 294 produce the logical high signals needed to turn one of the two remaining windings 74 to ground. Whether or not that particular winding is tied to ground is a function of the SPEED_CONTROL$_{PWM}$ signal. As discussed above, whenever the SPEED_CONTROL$_{PWM}$ signal is in the logical low state, the NAND gate 310, 312 or 314 already receiving two logical high signals will receive the third logic high signal to cause the gate to output the logical low signal. The logical low signal produced by the active NAND gate 310, 312 or 314 causes the complementary NAND gate 334, 336 or 338, respectively, to output the logical high LOW_DRIVER signal. Since the LOW_DRIVER signal is only asserted when the SPEED_CONTROL$_{PWM}$ signal is in the low state, the on duty-cycle at which the individual LOW_DRIVER signals are asserted will vary with the on duty cycle of the SPEED_CONTROL$_{PWM}$ signal.

It should be understood that the on/off rate of the SPEED_CONTROL$_{PWM}$ signals is between 20 kHz and 200 kHz. This frequency is significantly higher than the 1 kHz to 6 kHz rate at which NOR gates 300, 302 and 304 are cycled on and off. Thus, as depicted by FIGS. 11D, 11E and 11F, during each time period one NOR gate 300, 302 or 304 is goes high, the complementary active NAND gates 310, 312 and 314 cycle on and off numerous times. This rapid on and off cycling of the NAND gates 310 312 and 314 results in the rapid connecting/disconnecting of the associated windings to ground.

Motor decoder 96, regulates the braking of the motor rotor 66. If the BRAKE_ON signal is received, the logical low, inverted version of this signal produced by invertor 324 is applied to NAND gate 328. As a result of this change in state of the input signal, NAND gate 328 asserts a high signal to NOR gates 300, 302 and 304. The receipt of this logical high signal effectively inhibits the NOR gates 300, 302 and 304 from asserting the HIGH_DRIVER signals required to energize the windings 74.

Simultaneously, with the forcing of NOR gates 300, 302 and 304 to the logical low output signal state, the logical high BRAKE_ON signal is applied to NAND gate 326. If the motor decoder 96 is properly functioning, none of the NOR gates 300, 302 and 304 are asserting the HIGH_DRIVER signals. Therefore, NOR gate 332 should, at this time, be asserting a logical high signal. Assuming at this time the logical high FAULT signal is still being asserted, NAND gate 326 is thus presented with three logical high input signals. NAND gate 326 produces a logical low output signal. This signal is referred to as a BRAKE_ACTUATE (B_A) signal.

The BRAKE_ACTUATE output signal produced by NAND gate 326 is applied as the input signals to NAND gates 334, 336 and 338. Consequently, NAND gates 334, 336 and 338 simultaneously assert the LOW_DRIVER signals that cause the windings 74 to simultaneously be tied to ground. The inductive forces developed by the windings 74 when in this state serves as a braking force that decelerates the movement of motor rotor 66.

However, in the event of a malfunction of the motor decoder 96, one of the NOR gates 300, 302 or 304 may continue to assert a HIGH_DRIVER signal when the logical high BRAKE_ON signal is applied to NAND gate 326. If this occurs, NOR gate 332 will assert a low signal to the third input into NAND gate 326. The presentation of this signal to NAND gate 326 prevents the NAND gate 326 from asserting the logical low BRAKE_ACTUATE signal required to cause the simultaneous assertion of the LOW_DRIVER signals by NAND gates 334, 336 and 338. Thus, NOR gate. 332 provides a failsafe signal that prevents the windings 74 from being simultaneously tied to ground while an energization current is being applied to any one of the windings.

Should invertor 118 assert the logical low FAULT signal, motor decoder 96 inhibits the assertion of both the HIGH_ and LOW_DRIVER signals. Specifically, the presence of the FAULT signal causes NAND gate 328 to assert a logical high output signal. The presence of this logical high signal blocks NOR gates 300, 302 and 304 from asserting HIGH_DRIVER signals. The logical high signal produced by NAND gate 328 is also applied as input into NOR gate 330. Consequently, NOR gate 330 asserts a low signal to NAND gates 310, 312 and 314. The assertion of this low signal to NAND gates 310, 312 and 314 prevents these gates from asserting the logical low signals the need to produce in order to cause the LOW_DRIVER signals to be asserted.

The FAULT signal is also presented to one of the inputs of NAND gate 326. Consequently, even if the BRAKE_ON signal is asserted and NOR gate 332 asserts a high signal, NAND gate 326 is locked into asserting a logical high output signal. Thus, when the FAULT signal is asserted, motor decoder 96 will not assert the LOW_DRIVER signals even if the BRAKE_ON signal is asserted.

Motor decoder 96 also prevents the motor 24 from continually drawing current above what the motor is programmed to draw. In the event there is excess current flow through one of the windings 74, there will be a corresponding rise in voltage across resistor 86 (FIG. 3B). If the level of the CUR+ signal into comparator 316 exceeds the reference CUR-signal, the comparator asserts the CURRENT_LIMIT signal. The CURRENT_LEVEL signal is received by NOR gates 318 and 320 which, in turn causes NOR gate 322 to latch a logical high output signal. The logical high output signal produced by NOR gate 322 is applied to NOR gate 330 as a CURRENT_BLOCK signal so as to cause NOR gate 330 to produce a logical low signal. As discussed above, the logical low signal produced by NOR gate 330 prevents NAND gates 310, 312 and 314 from producing the logical low signals required to cause the generation of the LOW_DRIVER signals.

As mentioned above, NOR gates 318, 320 and 322 cooperate to latch the output signal from NOR gate 322 high. Thus, NOR gate 330 produces a logical low signal that prevents the assertion of the LOW_DRIVER signals for a specific amount of time. This amount of time is the amount of time it takes the CLOCK signal applied to the second input of NOR gate 320 to transition from logical high to logical low. At the time of this transition, the current drawn by the motor 24 is typically well below that to cause the assertion of the CURRENT_LIMIT signal. Thus, this latching and resetting of the output signal from NOR gate 322 prevents the CURRENT_LIMIT signal from developing a high frequency on/off oscillating profile and the resultant on/off ringing of the LOW_DRIVER signals.

Figure 12:
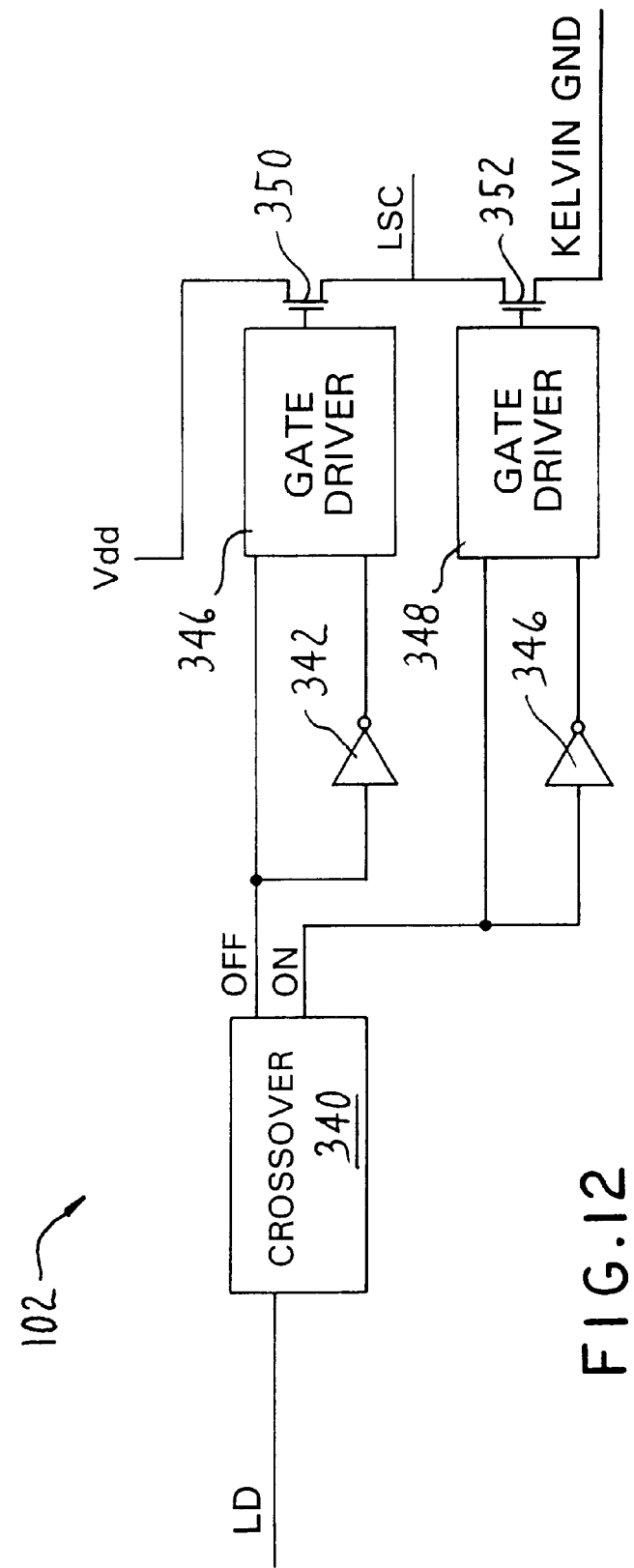
FIG. 12 is a block diagram of the low side driver that is internal to the chip.

The basic structure of one of the low side drivers 102 is now explained by reference to FIG. 12. The low side driver 102 includes a crossover circuit 340 which is the circuit to which the associated LOW_DRIVER signal is applied. The crossover circuit 340 includes a set of FETs that produce both an OFF signal and an ON signal. The OFF signal is identical to the LOW_DRIVER signal except for the propagation delay of the components employed to produce it. The ON signal is a delayed version of the OFF signal that lags the OFF signal by approximately 20 to 200 nanoseconds.

Both the ON and OFF signals are applied to invertors 342 and 344, respectively. The OFF signal and its complement are applied to a gate driver 346. The ON signal and its complement are applied to a gate driver 348. Gate drivers 346 and 348 are each formed out of a set of FETs. The FETs forming each gate driver 346 and 348 are arranged so that the "turn-on" and "turn-off" signals produced by the driver are not produced simultaneously.

Gate drivers 346 and 348 each produce separate turn-on and turn-off signals. The output signals produced by gate driver 346 are applied to the gate of a FET 350. The output signal produced by gate driver array 348 are applied to the gate of a FET 352. FETs 350 and 352 are connected together in series. The drain of FET 350 is tied to the on chip $V_{dd}$ voltage rail. The source of FET 352 is tied to ground. In preferred versions of the chip, it is understood that the source of FET 352 is tied to a Kelvin ground external to the chip 62, (off-chip conductor not shown). Both FETs 350 and 352 are configured so as to allow a relatively high saturation current, for example between 500 and 1,200 mA. The signal present at the junction of FETs 350 and 352 is the LOW_SIDE_CONTROL control signal generated by motor control chip to the associated off-chip FET 76.

The OFF and ON signals and their complements control when the gate drivers 346 and 348 assert their turn-on and turn-off signals to FETs 350 and 352, respectively. Owing to the sequencing of the OFF and ON signals, when the LOW_SIDE_CONTROL signal is to be asserted, FET 352 will be turned off momentarily before FET 350 is turned on. Then, when the LOW_SIDE_CONTROL signal is to be negated, FET 350 is turned off before FET 352 is turned on. Since the LOW_DRIVER signal that regulates the assertion of the LOW_SIDE_CONTROL signal by driver 102 has a variable on duty cycle, the LOW_SIDE_CONTROL signal produced by the driver likewise has a variable on duty cycle.

Figure 13:
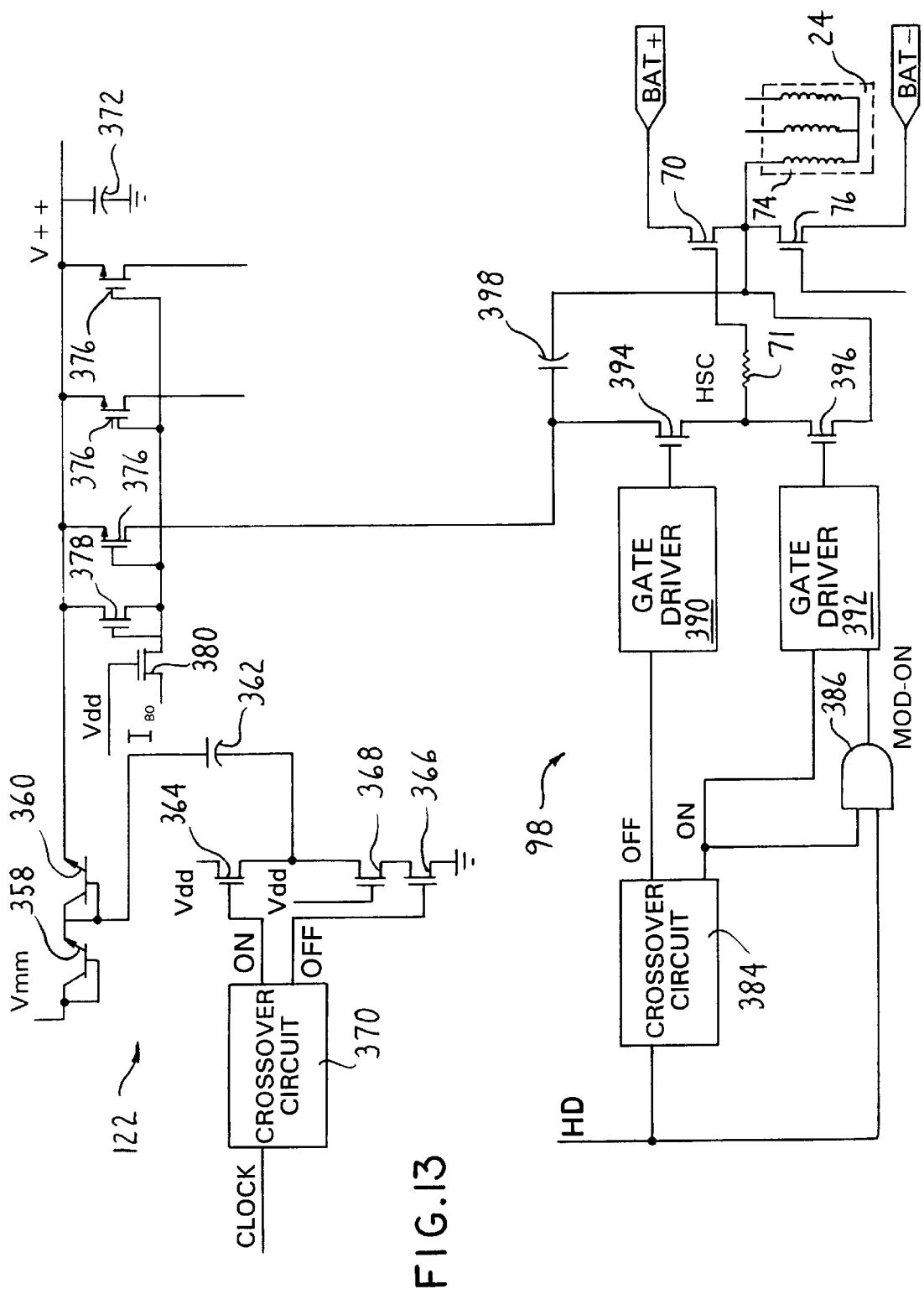
FIG. 13 is a block and schematic diagram of the high side bias circuit and one of the high side drivers internal to the chip.

The structure of a high side driver 98 and the high side bias circuit 122 are now discussed by reference to FIG. 13. The high side bias circuit 122 produces the high voltage signal that required to turn on the FETs 70. In some versions of the invention, this signal has a potential of approximately 24 VDC. The high side driver 98 selectively applies this signal to the gate of the FET 70 with which it is associated as the HIGH_SIDE_CONTROL signal.

High side bias circuit 122 includes two npn transistors 358 and 360. The collector of transistor 358 is tied to an on-chip bus to receive a $V_{mm}$ signal which is the potential across the battery 28. Not illustrated is the conductor over which transistor 358 is tied to positive contact 72. The collector of transistor 360 is tied to the emitter of transistor 358. The emitter of transistor 360 is tied to the $V^{++}$ voltage rail on the chip 62. The bases of both transistors 358 and 360 are tied to their collectors so that the transistors essentially function as diodes.

An off chip capacitor 362 is tied at one end to the junction of transistors. The opposed end of capacitor 362 is selectively tied to either the on-chip $V_{dd}$ voltage rail or ground. Specifically, a FET 364 selectively ties the capacitor 362 to the $V_{dd}$ voltage rail; a FET 366 selectively ties the capacitor to ground. It will be noted that in the depicted version of the invention a FET 368 is located between the capacitor 362 and FET 366. The $V_{dd}$ signal is applied to the gate of FET 368 so that FET 368 is always on. FET 368 thus provides voltage isolation protection for FET 366.

It should also be understood that in some preferred versions of this invention, multiple parallel FETs 364 and 366 are provided to provide a low impedance between capacitor 362 and the voltage source or ground. When multiple FETs 366 are provided, multiple FETs 368 are likewise provided.

The on/off states of FETs 364 and 366 are controlled by a crossover circuit 370 which is also part of the on-chip high side bias circuit 122. Crossover circuit 370 receives as its primary input signal the CLOCK signal from the pulse width modulator 90. The crossover circuit 370, based on the state of the CLOCK signal produces an OFF signal and ON signal. In comparison to the ON signal, the OFF signal is asserted 20 to 200 nanoseconds sooner. The OFF signal is applied to the gate of FET 364. The ON signal is applied to the gate of FET 366. The OFF and ON signal are sequentially asserted to cause FETs 364 and 366 to alternatively connect capacitor 362 to the $V_{dd}$ rail or ground. This toggling of capacitor 362 causes a voltage equal to twice the $V_{dd}$ voltage appear across the capacitor. Consequently, the voltage across present at the emitter of transistor 360 is equal to twice the $V_{dd}$ voltage, minus the voltage drops across transistors 358 and 360. This voltage is filtered by an off-chip capacitor 372.

The voltage present at the emitter of transistor 360 is also applied to sources of three identical FETs 376 that are part of the on-chip high side bias circuit 122. Each FET 376 serves as a constant current source for a separate one of the high side drivers. The source of a fourth FET 378 is also tied to the emitter of transistor 360. The gates of FETs 376 and 378 are tied to the source of a FET 380. The drain of FET 380 is tied to receive a $I_{80}$ signal which is the current required to turn on FETs 376 and 378 so that there is 80 mA of current flow therethrough. The gate of FET 380 receives the $V_{dd}$ signal which turns FET 380 on.

The high side driver 98 selectively outputs the constant current, voltage boosted output signal from the associated high side bias circuit FET 376 as the HIGH_SIDE_CONTROL signal. The high side driver includes a crossover circuit 384 to which the associated HIGH_DRIVER signal from the motor decoder 96 is applied. Based on the receipt of the HIGH_DRIVER signal, crossover circuit 384 produces an OFF and ON signals. The OFF and ON signals produced by crossover circuit 384 are synchronized with respect to the HIGH_DRIVER signal in a pattern identical to how the OFF and ON signals produced by low side driver crossover circuit 340 to the LOW_DRIVER signal.

The ON signal produced by the crossover circuit 384 is applied as one input to an AND gate 386. It should be recognized that, in some versions of this invention AND gate 386 is formed out of a set of discrete FETs on chip 62. The second input into AND gate 386 is the HIGH_DRIVER signal from the motor decoder.

The OFF signal produced by crossover circuit 384 is applied to a gate driver 390. The ON signal and the output signal from AND gate 386 are applied to a gate driver 392. Gate drivers 390 and 392 are both part of the on-chip high side driver 98. Gate drivers 390 and 392 are similar in function to previously described gate drivers 346 and 348. Gate drivers 390 and 292, however, receive the high voltage signal from the associated high side bias circuit FET 376. These voltages can be between 20 and 100 Volts. In the described version of the invention, these voltages are typically between 20 and 30 Volts. In order to provide protection against these high voltage signals, it should be understood that the output turn-on and turn-off voltages are produced by bipolar transistors internal to the gate drivers 390 and 392. The on/off state of these transistors are regulated by the signals produced by FETs internal to the gate drivers 390, 392 to which the output signals from crossover circuit 384 are applied.

Gate drivers 390 and 392 produce separate turn-on and turn-off signals. The output signals produced by gate driver 390 are applied to the gate of a FET 394. The output signals produced by gate driver 292 are applied to the gate of a FET 396. FETs 394 and 396 are connected together in series. The drain of FET 394 receives the high voltage signal from FET 376. The source of FET 396 is tied to the source of the associated high side external FET 70. The HIGH_SIDE_CONTROL signal is the signal present at the junction of FETs 394 and 396 when FET 394 is turned on and FET 396 is turned off.

The high side driver OFF, ON signals and the signal from AND gate 386 control gate driver 390 and 392 so that the drivers do not assert signals that turn both FETs 394 and 396 on at the same time. Thus, when the HIGH_SIDE_CONTROL signal is to be asserted, FET 396 is turned off before FET 394 is turned on. Similarly, when the HIGH_SIDE_CONTROL signal is to be negated, FET 394 is turned off before FET 396 is turned on.

The circuit of this invention further includes an off-chip capacitor 398 connected at one end to the junction of FET 70 and the associated winding 74. The opposed end of capacitor 398 is connected to the junction of the high side bias circuit FET 376 and the on-chip portion of the high side driver 98. Capacitor 398 provides additional current to the high side driver 98 once the motor is running. The added current supplied by capacitor 398 increases the speed at which FET 394 is switched on so as to increase the speed at which the HIGH_SIDE_CONTROL signal is asserted.

The motor control circuit of this invention selectively generates the HIGH_and LOW_SIDE_CONTROL signals to FETs 70 and 76, respectively. The turning on and off of FETs 70 and 76, in turn, selectively energizes the motor windings 74 to cause the rotation of the motor rotor 66. More specifically, the sequence in which the HIGH_and LOW_SIDE_CONTROL signals are generated is regulated as a function of the user-set trigger switches 36 and 38 so that the rotor turns in the direction and at the speed desired by the user.

When one of the FETs 76 is turned on to tie the associated motor winding 74 to ground, the associated FET 80 is turned on. The turning on of FET 80 causes a small current flow, proportion to the current flow through the winding 74, to flow through resistors 84, 86 and, normally, 86. Thus, the voltage across resistors 86 and 88 serves as a measure of current flow through the motor. Whenever this voltage rises above a reference level, the motor is recognized as drawing excess. Current. Whenever this occurs, comparator 316 and the motor decoder 96 cooperate to prevent the application of still additional current to the motor.

Moreover, the motor control circuit of this invention provides even further control of the motor when it is operated in the oscillate mode. Specifically, after each state change of the FORWARD/REVERSE signal, the forward reverse oscillator 92 both causes the braking of the motor rotor and inhibits the application of energization signals to the motor until the rotor 66 stops turning. Also, during the initial 50% of each FORWARD/REVERSE and $\overline{\text{FORWARD/REVERSE}}$ cycle of the motor when the tool 20 is operated in the oscillate mode, FET 252 is turned off. The turning off of FET 252 disconnects resistor 88 from the current measuring resistor network. Thus, the signal applied to comparator 316 is based only on the current flow through resistor 86. This signal is based on a higher volts/amp ratio than the volts/amp ratio present when resistor 88 is part of the current measuring resistor network. Consequently, during the initial part of each FORWARD/REVERSE and $\overline{\text{FORWARD/REVERSE}}$ cycle, the motor can only draw a reduced current before application of further energization is blocked. This prevents the rapid acceleration of the rotor once it starts turning in the desired direction. Collectively, this braking of the rotor and the prevention of its rapid reacceleration substantially eliminate the jerking of the motor when the tool 20 is operated in oscillation mode.

Still another feature of this invention is that integrated onto the motor control chip 62, which is a single substrate, are the pulse width modulator 90, the forward/reverse oscillator 92, the tachometer 94, the motor decoder 96, the drivers 98 and 102, the bandgap circuit 104 and the high side bias circuit 122. Thus, be having these components on a single chip the overall size of the circuit is kept to a minimum. Moreover, should the motor control circuit malfunction, the simple replacement of chip 62 will result in the substitution of substantially all the components of the motor control circuit. This single-part replacement serves to help keep the costs of maintain a tool with this chip 62 to a minimum.

It should be recognized that the foregoing description is directed to a single version of this invention and that other versions of this invention may vary from what has been described. For example, it may not be necessary to construct each version of this invention so that all the sub-circuits are integrated onto a single chip. Thus, there may be some versions of the invention in which the motor decoder 96, the high side drivers 98, the high side bias circuit and/or the low side drivers 102 are separate from the other sub circuits.

Similarly, not all versions of the invention may have the same structure. Thus, some versions of the motor control chip of this invention may be configured to generate energization signals that allow for only single speed operation of the motor with which it is used and/or do not allow for oscillatory operation. Moreover, the actual components from which the various sub-circuits forming this invention may vary from what has been described. For example, the MOTOR_ENABLE signal may not always serve as a logic type input signal. In some versions of this invention, the MOTOR_ENABLE signal, or related signal may serve as a switch signal that controls the assertion of an analog signal represented of the user-selected motor speed. Thus, when the MOTOR_ENABLE signal is asserted, this switch is opened so that it will appear to the down line components that the motor should be in its zero-speed state.

Also, it should be recognized that other signals than the signals generated by Hall sensors 65 may be applied to the motor control circuit of this invention in order to provide an indication of the rotational state of the motor rotor 66. For instance, it may be desirable to employ the back electromotive force pulse signals that are developed by the windings 74 as the signals that, collectively or individually, indicate rotor movement. These signals, which, like the output signals from the Hall sensors, are essentially pulsed rotor-state signals, are then applied to the on-chip tachometer which, in turn, generates the signal representative of rotor movement.

Moreover, it should likewise be recognizes that other tachometers may be constructed. For example, it may be possible to construct a tachometer in which the on/off duty cycle of its output pulses 50% on/50% off and the frequency of the pulses serves as the measure of motor speed.

Also, in still other versions of the invention, the measure of the current drawn by the motor 24 may be used as more than just an indication that the motor is temporarily drawing too much current. For instance, it may be desirable to configure the motor controller so that it regulates the energization of the motor in order to cause the motor to develop a specific torque. In these versions of the invention, the circuitry internal to the motor controller circuit would compare the signal representative of the current actually being drawn by the motor to a variable, user-set signal representative of the current the motor should be drawing. Then, based on this comparison, the motor controller would regulate the energization signals that are applied to the motor. This current-based regulation of the motor may be useful when the motor being regulated is some type of stepper motor.

Thus, it is the object of the appended claims to cover all variations that may come within the spirit and the scope of this invention.

The embodiments of the invention in which an exclusive property or privilege is claimed are defined as follows:

1. A motor control circuit for regulating the speed of a motor having a rotor, a plurality of windings located around the rotor and configured to generate a pulsed signal representative of the rotational position of the rotor, said circuit comprising:
   a tachometer for receiving the pulsed signal from the motor and producing a pulse width modulated TACHOMETER signal having an on duty cycle that is proportional to the frequency at which the pulsed signal is generated;,
   a pulse width modulator for receiving the TACHOMETER signal and a USER_SPEED signal representative of a user-selected speed, said pulse width modulator configured to generated a pulse width modulated SPEED_CONTROL$_{PWM}$ signal that has an on-duty cycle proportional to the difference between an integral of the TACHOMETER signal and the USER_SPEED signal; and
   a motor driver for receiving the pulsed signal from the motor and the SPEED_CONTROL$_{PWM}$ signal for producing a plurality of HIGH_SIDE_CONTROL signals, each HIGH_SIDE_CONTROL signal being asserted to cause a separate one of the motor windings to be connected to a power source, and a plurality of LOW_SIDE_CONTROL signals, each LOW_SIDE_CONTROL signal being asserted to cause a separate one of the motor windings to be connected to ground, wherein the motor driver sequentially asserts the HIGH_SIDE_CONTROL signals and the LOW_SIDE_CONTROL signals as a function of the pulsed signal and the on-duty cycle of the SPEED_CONTROL$_{PWM}$ signal.

2. The motor control circuit of claim 1, wherein said pulse width modulator includes:
   an amplifier circuit for receiving the TACHOMETER signal and the USER_SPEED signal for producing an analog SPEED_CONTROL signal as a function of the difference between the USER_SPEED signal and the TACHOMETER signal; and
   a convertor circuit for receiving the SPEED_CONTROL signal and producing the SPEED_CONTROL$_{PWM}$ signal so that the SPEED_CONTROL$_{PWM}$ signal has an on-period directly proportional to the magnitude of the SPEED_CONTROL signal.

3. The motor control circuit of claim 2, wherein:
   said pulse width modulator includes a comparator for comparing the SPEED_CONTROL signal to a reference signal, and based on the comparison, said comparator asserts a BRAKE signal; and
   said motor driver receives the BRAKE signal and is configured so that, upon receiving the BRAKE signal, said motor driver inhibits assertion of the HIGH_SIDE_CONTROL signals and asserts the LOW_SIDE_CONTROL signals to cause deceleration of the motor rotor.

4. The motor control circuit of claim 1, wherein:
   the motor generates a plurality of pulsed signals representative of the rotational position of the motor rotor; and
   said tachometer includes:
      a pulse detection circuit receiving the pulsed signals and that produces a pulse train representative of the rise and fall of the pulse signals; and
      a pulse generator for producing a train of constant width pulses as the TACHOMETER signal, said pulse generator being configured to receive the pulse train from said pulse detection circuit, said pulse generator configured to produce the constant width pulses forming the TACHOMETER signal at a frequency proportional to the frequency of the pulses forming the pulse train from said pulse detection circuit.

5. The motor control circuit of claim 4, wherein said pulse detection circuit includes:
   a plurality of edge detector circuits, each said edge detector circuit being connected to receive a separate set of pulsed signals from the motor and to produce pulsed output signals based on the transitions of the received pulse signals; and
   an adding circuit connected to said edge detector circuits for receiving the pulse output signals therefrom for producing the pulse train based on the sum of the pulsed output signals.

6. A direction control oscillator for generating motor control signals indicating if a motor rotor should operate in a forward state, a reverse state or oscillate between the forward and reverse states, said direction control oscillator including:
   a first logic circuit connected to receive a first user-generated direction signal indicating that the motor should operate in the forward state and a second user-generated direction signal indicating that the motor should operate in the reverse state, said first logic circuit configured to generate a MOTOR_ENABLE signal when either the first user-generated direction signal or the second user-generated direction signal is received;
   a second logic circuit connected to receive the first user-generated direction signal and the second user-generated direction signal, said second logic circuit configured to generate a FORWARD/REVERSE signal wherein: when only the first user-generated direction signal is received, a FORWARD/$\overline{\text{REVERSE}}$ state signal is generated; when only the second user-generated signal is received, a $\overline{\text{FORWARD}}$/REVERSE state signal is generated; and, when both the first and second user-generated direction signals are received, the FORWARD/REVERSE signal is cyclically transitioned between the FORWARD/$\overline{\text{REVERSE}}$ state signal and the $\overline{\text{FORWARD}}$/REVERSE state signal; and a third logic circuit connected to receive the first and second user-generated direction signals and the MOTOR_ENABLE signal, said third logic circuit configured to selectively forward the MOTOR_ENABLE signal or a $\overline{\text{MOTOR\_ENABLE}}$ signal, wherein, when both the first and second user-generated direction signal are received, after each state transition of the FORWARD/REVERSE signal, said third logic circuit forwards the $\overline{\text{MOTOR\_ENABLE}}$ signal for a select period of time before forwarding the MOTOR_ENABLE signal.

7. The direction control oscillator of claim 6, wherein said third logic circuit is connected to receive a TACHOMETER signal representative of rotor speed, and said third logic circuit is configured so that after each state transition of the FORWARD/REVERSE signal when both the first and second user-generated direction signals are received, said third logic circuit forwards the $\overline{\text{MOTOR\_ENABLE}}$ signal until the TACHOMETER signal indicates the motor rotor has stopped turning and, after the TACHOMETER signal indicates that the motor rotor has stopped turning, said third logic circuit forwards the MOTOR_ENABLE signal.

8. The direction control oscillator of claim 6, wherein said third logic circuit is connected to receive a BRAKE_ENABLE signal and said third logic circuit is configured to generate a BRAKE_ON signal when said BRAKE_ENABLE signal is received and, when both the first and second user-generated direction signal are received, after each state transition of the FORWARD/REVERSE signal, said third logic circuit also generates the BRAKE_ON signal for a select period of time.

9. The direction control oscillator of claim 8, wherein, when said third logic circuit receives the first and second user-generated direction signals, said third logic circuit forwards the $\overline{\text{MOTOR\_ENABLE}}$ signals and transmits the BRAKE_ON signal at the same time.

10. The direction control oscillator of claim 8, wherein said third logic circuit is connected to receive a TACHOMETER signal indicating if the motor rotor is turning, and said third logic circuit is configured so that when the first, and second user-generated direction logic signals are received, after each state transition of the FORWARD/REVERSE signal, said third logic circuit transmits the BRAKE_ON signal until the TACHOMETER signal indicates the motor rotor has stopped turning and, after the TACHOMETER signal indicates that the motor rotor has stopped turning, said third logic circuit transmits a $\overline{\text{BRAKE\_ON}}$ signal.

11. A motor driver circuit for a motor having a plurality of windings and, a rotor, wherein the motor generates a plurality of pulsed signals that are representative of the rotational position of the rotor, said driver circuit including:

a first gate array for receiving the pulsed signals from the motor, a MOTOR_ENABLE signal indicating that the motor is to be actuated and a BRAKE_ON signal indicating that the motor is to be braked, said first gate array configured to sequentially assert a plurality of HIGH_DRIVER signals to cause the motor windings to be individually tied to a power supply when the MOTOR_ENABLE signal and a BRAKE_ON signal are received, wherein said first gate array sequentially asserts the HIGH_DRIVER signals based on the state of the pulsed signals;

a second gate array for receiving the pulsed signals from the motor, the MOTOR_ENABLE signal and a pulse width modulated SPEED_CONTROL signal, said second gate array configured to sequentially assert variable LOW_DRIVER signals that have a variable on duty-cycle to tie the motor windings to ground when the MOTOR_ENABLE signal is asserted, wherein said second gate array asserts the LOW_DRIVER signals individually based on the state of the pulsed signals, and so that the on duty-cycle of the LOW_DRIVER signals is a function of the duty cycle of the SPEED_CONTROL signal.

12. The motor driver circuit of claim 11, further including:

a brake circuit configured to receive the BRAKE_ON signal and the HIGH_DRIVER signals, said brake circuit being configured to assert a BRAKE_ACTUATE signal when the BRAKE_ON signal is asserted and the HIGH_DRIVER signals are not asserted; and wherein said second gate array is configured to receive said BRAKE_ACTUATE signal and to simultaneously assert each said LOW_DRIVER signal when said BRAKE_ACTUATE signal is asserted.

13. The motor driver circuit of claim 11, further including:

a comparator for receiving a signal representative of current flow through the motor windings, said comparator configured to generate a CURRENT_LIMIT signal when the current flow through the windings exceeds a set amount;

a timer configured to receive the CURRENT_LIMIT signal and to assert a CURRENT_BLOCK signal for a set period of time after the CURRENT_LIMIT signal is received, and wherein said second gate array is configured to receive said CURRENT_BLOCK signal and to inhibit assertion of the LOW_DRIVER signals when said CURRENT_BLOCK signal is received.

14. An integrated circuit for regulating the operation of a motor having a variable speed rotor, a plurality of windings that are selectively tied to a power source or ground, wherein the motor generates at least one pulsed signal representative of the rotational position of the rotor, said integrated circuit comprising:

a tachometer for receiving the pulsed signal from the motor said tachometer including:

a current source;

a switch array for selectively tieing a first capacitor to said current source or ground, wherein said switch array is configured to tie the capacitor to the current source for a fixed period of time after each pulsed signal is received; and a first pulse generator connected to the first capacitor for producing TACHOMETER$_{PWM}$ pulses as a function of the voltage across the capacitor; a pulse width modulator including:

an amplifier having a first input to which integrated TACHOMETER$_{PWM}$ pulses are applied, a second input to which an analog, user-set USER_SPEED signal is applied, said amplifier producing a SPEED_CONTROL signal as a function of the difference between the USER_SPEED signal and the integrated TACHOMETER$_{PWM}$ pulses; and a second pulse generator connected to the amplifier for receiving the SPEED_CONTROL signal, said second pulse generator configured to produce a pulsed SPEED_CONTROL$_{PWM}$ signal, wherein the SPEED_CONTROL$_{PWM}$ signal has an on duty-cycle proportional to the magnitude of the SPEED_CONTROL signal; and a motor driver responsive to the SPEED_CONTROL$_{PWM}$ signal and the pulsed signal from the motor for sequentially asserting HIGH_SIDE_CONTROL signals to tie the windings of the motor to a power source and variable on duty-cycle LOW_SIDE_CONTROL signals to tie the windings of the motor to ground, wherein, said motor driver sequentially asserts the HIGH_SIDE_CONTROL and the LOW_SIDE_CONTROL signals as a function of the pulsed signal and varies the on duty-cycle of the LOW_SIDE_CONTROL signals as a function of the on duty-cycle of the SPEED_CONTROL$_{PWM}$ signal.

15. The integrated circuit of claim 14, further including:

a forward/reverse controller for receiving a user-set forward signal when the motor is to be run in a forward direction and a user-set reverse signal when the motor is to be run in a reverse direction, wherein, said forward/reverse controller is configured to assert a MOTOR_ENABLE signal when either the forward signal or the reverse signal is received and a FORWARD/REVERSE signal, the FORWARD/REVERSE signal being in a FORWARD/REVERSE signal state when the forward signal is received and in a $\overline{\text{FORWARD/REVERSE}}$ signal state when the reverse signal is received; and wherein said motor driver receives the MOTOR_ENABLE signal and the FORWARD/REVERSE signal and is further configured to inhibit assertion of the HIGH_SIDE_CONTROL signals when a $\overline{\text{MOTOR\_ENABLE}}$ signal is received and further regulates the sequence in which the HIGH_SIDE_CONTROL and the LOW_SIDE_CONTROL signals are asserted as a function of the state of the FORWARD/REVERSE signal.

16. The integrated circuit of claim 15, wherein said forward/reverse controller is configured so that, when both the user-set forward signal and the user-set reverse signal are received, said forward/reverse controller causes the FORWARD/REVERSE signal to cyclically transition between the FORWARD/$\overline{\text{REVERSE}}$ signal state and the $\overline{\text{FORWARD/REVERSE}}$ signal state.

17. An integrated circuit for regulating the operation of a motor having a rotor and a plurality of windings that are selectively tied to a power source or ground, said integrated circuit comprising:

a pulse width modulator for receiving a signal representative of the speed of the motor rotor and an analog, user-set USER_SPEED signal, said pulse width modulator configured to produce a pulse width modulated SPEED_CONTROL$_{PWM}$ signal that has an on duty-cycle that varies as a function of the speed of the motor and the USER_SPEED signal;

a forward/reverse controller for receiving a user-set forward signal when the motor is to be run in a forward direction and a user-set reverse signal when the motor is to be run in a reverse direction, wherein, said forward/reverse controller is configured to assert a MOTOR_ENABLE signal when either the forward signal or the reverse signal is received and a FORWARD/REVERSE signal, the FORWARD/REVERSE signal being in a FORWARD/REVERSE signal state when the forward signal is received and in a $\overline{\text{FORWARD/REVERSE}}$ signal state when the reverse signal is received and, wherein:

when both the user-set forward signal and the user-set reverse signal are received, said forward/reverse controller causes the FORWARD/REVERSE signal to cyclically transition between the FORWARD/$\overline{\text{REVERSE}}$ signal state and the $\overline{\text{FORWARD/REVERSE}}$ signal state; and said forward/reverse controller is further configured to receive a motor speed signal indicating if the motor rotor is turning and, when both the user-set forward signal and the user-set reverses signal are received, with each signal state transition of the FORWARD/REVERSE signal, said forward reverse controller asserts a $\overline{\text{MOTOR\_ENABLED}}$ signal until the rotor speed signal indicates that the motor rotor has stopped turning; and a motor driver responsive to the SPEED_CONTROL$_{PWM}$ signal and a signal representative of the rotational position of the motor rotor for sequentially asserting HIGH_SIDE_CONTROL signals to tie the windings of the motor to a power source and LOW_SIDE_CONTROL signals that have a variable on duty-cycle to tie the windings of the motor to ground, wherein, said motor driver sequentially asserts the HIGH_SIDE_CONTROL and the LOW_SIDE_CONTROL signals as a function of the rotational position of the motor rotor and varies the on duty-cycle of the LOW_SIDE_CONTROL signals as a function of the on duty-cycle of the SPEED_CONTROL$_{PWM}$ signal and wherein said motor driver receives the MOTOR_ENABLE signal and the FORWARD/REVERSE signal and is further configured to inhibit assertion of the HIGH_SIDE_CONTROL signals when a $\overline{\text{MOTOR\_ENABLE}}$ signal is received and further regulates the sequence in which the HIGH_SIDE_CONTROL and the LOW_SIDE_CONTROL signals are asserted as a function of the state of the FORWARD/REVERSE signal.

18. The integrated circuit of claim 17, further including a tachometer circuit for receiving the signals representative of the rotational position of the rotor for generating a TACHOMETER signal representative of motor speed and, wherein, said pulse width modulator receives the TACHOMETER signal as the signal representative of the speed of the motor.

19. The integrated circuit of claim 18, wherein: said tachometer circuit includes:

a current source;

a switch array for selectively tieing a first capacitor to said current source or ground, wherein said switch array is configured to tie the capacitor to the current source for a fixed period of time after each signal representative of motor rotor position is received; and a first pulse generator connected to the first capacitor for producing TACHOMETER$_{PWM}$ pulses as a function of the voltage across the capacitor; and said pulse width modulator receives the TACHOMETER$_{PWM}$ pulses as the TACHOMETER signal.

20. An integrated circuit for regulating the operation of a motor having a rotor and a plurality of windings that are selectively tied to a power source or ground, said integrated circuit comprising:

a pulse width modulator for receiving a signal representative of the speed of the motor rotor and an analog, user-set USER_SPEED signal, said pulse width modulator configured to:

produce a pulse width modulated SPEED_CONTROL$_{PWM}$ signal that has a variable on duty-cycle that varies as a function of the speed of the motor and the USER_SPEED signal; and to produce a BRAKE signal whenever the speed of the rotor is exceeding the user-set speed by a selected amount; and a motor driver responsive to the SPEED_CONTROL$_{PWM}$ signal, the BRAKE signal and a signal representative of the rotational position of the motor rotor for sequentially asserting HIGH_SIDE_CONTROL signals to tie the windings of the motor to a power source and LOW_SIDE_CONTROL signals that have a variable on duty-cycle to tie the windings of the motor to ground, wherein, said motor driver sequentially asserts the HIGH_SIDE_CONTROL and the LOW_SIDE_CONTROL signals as a function of the rotational position of the motor rotor and varies the on duty-cycle of the LOW_SIDE_CONTROL signals as a function of the on duty-cycle of the SPEED_CONTROL$_{PWM}$ signal and wherein, when said motor driver receives the BRAKE signal, said motor driver selectively asserts and negates the HIGH_SIDE_CONTROL and the LOW_SIDE_CONTROL signals to cause braking of the motor rotor.

21. The integrated circuit of claim 20, wherein said motor driver is configured to cause the braking of the motor by inhibiting assertion of the HIGH_SIDE_CONTROL signals and simultaneously asserting a plurality of the LOW_SIDE_CONTROL signals.

22. The integrated circuit of claim 21, wherein said motor driver is further configured so that, while said HIGH_SIDE_CONTROL signals are being asserted, said motor driver inhibits the assertion of the plurality of the LOW_SIDE_CONTROL signals required to cause braking of the motor rotor.

23. The integrated circuit of claim 20, further including a tachometer circuit for receiving signals representative of the rotational position of the rotor for generating a TACHOMETER signal representative of motor speed and, wherein, said pulse width modulator receives the TACHOMETER signal as the signal representative of the speed of the motor.

* * * * *

UNITED STATES PATENT AND TRADEMARK OFFICE
CERTIFICATE OF CORRECTION

PATENT NO. : 6,025,683
DATED : February 15, 2000
INVENTOR(S) : Chris Philipp

It is certified that error appears in the above-indentified patent and that said Letters Patent is hereby corrected as shown below:

Column 25, line 35; change "receives the first and second" to
---receives both the first and second---.

Column 26, line 43; change "motor said tachometer" to
---motor, said tachometer---.

Column 28, line 10; change "forward reverse" to ---forward/reverse---.

Signed and Sealed this

Thirteenth Day of March, 2001

Attest:

NICHOLAS P. GODICI

Attesting Officer

Acting Director of the United States Patent and Trademark Office